United States Patent
Eyuboglu et al.

(10) Patent No.: US 8,615,238 B2
(45) Date of Patent: Dec. 24, 2013

(54) RADIO NETWORK CONTROL

(75) Inventors: Vedat Eyuboglu, Concord, MA (US); Arthur J. Barabell, Sudbury, MA (US); Sanjay Cherian, Brookline, NH (US)

(73) Assignee: Ericsson EVDO Inc., Dover, DE (US)

( * ) Notice: Subject to any disclaimer, the term of this patent is extended or adjusted under 35 U.S.C. 154(b) by 0 days.

(21) Appl. No.: 12/857,206

(22) Filed: Aug. 16, 2010

(65) Prior Publication Data

US 2011/0032824 A1 Feb. 10, 2011

Related U.S. Application Data

(63) Continuation of application No. 11/037,896, filed on Jan. 18, 2005, and a continuation-in-part of application No. 10/848,597, filed on May 18, 2004, now Pat. No. 7,170,871, which is a continuation-in-part of application No. 09/891,103, filed on Jun. 25, 2001.

(51) Int. Cl.
*H04W 36/00* (2009.01)
*H04W 4/00* (2009.01)

(52) U.S. Cl.
USPC .......................... 455/436; 370/331

(58) Field of Classification Search
USPC .................. 455/453, 436–448; 370/331
See application file for complete search history.

(56) References Cited

U.S. PATENT DOCUMENTS

| | | | |
|---|---|---|---|
| 5,128,938 A | 7/1992 | Borras | |
| 5,239,675 A | 8/1993 | Dudczak | |
| 5,574,996 A | 11/1996 | Raith | |
| 5,790,528 A | 8/1998 | Muszynski | |
| 5,828,661 A | 10/1998 | Weaver et al. | |
| 5,852,630 A | 12/1998 | Langberg et al. | |
| 5,857,154 A | 1/1999 | Laborde et al. | |
| 5,940,762 A | 8/1999 | Lee et al. | |
| 5,983,282 A | 11/1999 | Yucebay | |
| 5,991,635 A | 11/1999 | Dent et al. | |
| 6,023,625 A | 2/2000 | Myers | |
| 6,052,594 A | 4/2000 | Chuang et al. | |
| 6,061,560 A | 5/2000 | Saboorian et al. | |
| 6,069,871 A * | 5/2000 | Sharma et al. | 370/209 |
| 6,091,953 A | 7/2000 | Ho et al. | |

(Continued)

FOREIGN PATENT DOCUMENTS

| | | |
|---|---|---|
| CN | 101015224 A | 8/2007 |
| CN | 101015224 B | 5/2012 |

(Continued)

OTHER PUBLICATIONS

USPTO Office Action in U.S. Appl. No. 11/166,893, dated Sep. 2, 2010, 31 pages.

(Continued)

*Primary Examiner* — Temica M Beamer
*Assistant Examiner* — Joel Ajayi
(74) *Attorney, Agent, or Firm* — Ericsson EVDO Inc.

(57) ABSTRACT

In a radio access network, multiple radio network controllers are connected to several radio nodes using a network. The interconnected radio network controllers and radio nodes are addressable, and, therefore, each radio network controller can communicate directly with each radio node and visa versa. The radio access network can be configured to avoid active handoffs between radio network controllers by maintaining a traffic channel set up between an access terminal and a radio network controller even as the flow.

39 Claims, 4 Drawing Sheets

(56) References Cited

U.S. PATENT DOCUMENTS

| | | | |
|---|---|---|---|
| 6,111,857 A | 8/2000 | Soliman et al. | |
| 6,119,024 A | 9/2000 | Takayama | |
| 6,223,047 B1 | 4/2001 | Ericsson | |
| 6,246,674 B1 | 6/2001 | Feuerstein et al. | |
| 6,252,862 B1 | 6/2001 | Sauer et al. | |
| 6,256,300 B1 | 7/2001 | Ahmed et al. | |
| 6,272,148 B1 | 8/2001 | Takagi et al. | |
| 6,285,875 B1 | 9/2001 | Alajoki et al. | |
| 6,289,220 B1 * | 9/2001 | Spear | 455/436 |
| 6,366,961 B1 | 4/2002 | Subbiah et al. | |
| 6,370,381 B1 * | 4/2002 | Minnick et al. | 455/445 |
| 6,393,482 B1 | 5/2002 | Rai et al. | |
| 6,400,712 B1 * | 6/2002 | Phillips | 370/355 |
| 6,404,754 B1 | 6/2002 | Lim | |
| 6,408,182 B1 | 6/2002 | Davidson et al. | |
| 6,418,306 B1 | 7/2002 | McConnell | |
| 6,438,370 B1 | 8/2002 | Einola et al. | |
| 6,438,377 B1 | 8/2002 | Savolainen | |
| 6,445,922 B1 | 9/2002 | Hiller et al. | |
| 6,473,399 B1 * | 10/2002 | Johansson et al. | 370/229 |
| 6,477,159 B1 | 11/2002 | Yahagi | |
| 6,480,476 B1 * | 11/2002 | Willars | 370/311 |
| 6,539,030 B1 | 3/2003 | Bender et al. | |
| 6,542,481 B2 | 4/2003 | Foore et al. | |
| 6,560,453 B1 | 5/2003 | Henry et al. | |
| 6,580,699 B1 | 6/2003 | Manning et al. | |
| 6,651,105 B1 | 11/2003 | Bhagwat et al. | |
| 6,711,144 B1 | 3/2004 | Kim et al. | |
| 6,731,618 B1 | 5/2004 | Chung et al. | |
| 6,738,625 B1 | 5/2004 | Oom et al. | |
| 6,741,862 B2 | 5/2004 | Chung et al. | |
| 6,757,319 B1 | 6/2004 | Parsa et al. | |
| 6,771,962 B2 | 8/2004 | Saifullah et al. | |
| 6,781,999 B2 | 8/2004 | Eyuboglu et al. | |
| 6,813,498 B1 | 11/2004 | Durga et al. | |
| 6,834,050 B1 | 12/2004 | Madour et al. | |
| 6,877,104 B1 | 4/2005 | Shimono | |
| 6,975,869 B1 | 12/2005 | Billon | |
| 7,035,636 B1 | 4/2006 | Lim et al. | |
| 7,047,009 B2 | 5/2006 | Laroia et al. | |
| 7,072,663 B2 | 7/2006 | Ramos et al. | |
| 7,079,511 B2 | 7/2006 | Abrol et al. | |
| 7,085,251 B2 | 8/2006 | Rezaiifar | |
| 7,130,626 B2 | 10/2006 | Bender et al. | |
| 7,130,668 B2 | 10/2006 | Chang et al. | |
| 7,162,247 B2 | 1/2007 | Baba et al. | |
| 7,170,871 B2 | 1/2007 | Eyuboglu et al. | |
| 7,177,650 B1 | 2/2007 | Reiger et al. | |
| 7,200,391 B2 | 4/2007 | Chung et al. | |
| 7,212,822 B1 | 5/2007 | Vicharelli et al. | |
| 7,242,958 B2 | 7/2007 | Chung et al. | |
| 7,251,491 B2 | 7/2007 | Jha | |
| 7,277,446 B1 | 10/2007 | Abi-Nassif et al. | |
| 7,298,327 B2 | 11/2007 | Dupray et al. | |
| 7,299,168 B2 | 11/2007 | Rappaport et al. | |
| 7,299,278 B2 | 11/2007 | Ch'ng | |
| 7,398,087 B1 | 7/2008 | McConnell et al. | |
| 7,408,887 B2 | 8/2008 | Sengupta et al. | |
| 7,408,901 B1 | 8/2008 | Narayanabhatla | |
| 7,453,912 B2 | 11/2008 | Laroia et al. | |
| 7,457,265 B2 | 11/2008 | Julka et al. | |
| 7,486,696 B2 | 2/2009 | Garg et al. | |
| 7,512,110 B2 | 3/2009 | Sayeedi et al. | |
| 7,515,643 B2 | 4/2009 | Chung | |
| 7,546,124 B1 | 6/2009 | Tenneti et al. | |
| 7,558,356 B2 | 7/2009 | Pollman et al. | |
| 7,558,588 B2 | 7/2009 | To et al. | |
| 7,603,127 B2 | 10/2009 | Chung et al. | |
| 7,626,926 B2 | 12/2009 | Abi-Nassif et al. | |
| 7,672,682 B2 | 3/2010 | Sharma et al. | |
| 7,729,243 B2 | 6/2010 | Ananthaiyer et al. | |
| 7,730,189 B2 | 6/2010 | Harikumar et al. | |
| 7,751,835 B2 | 7/2010 | Sharma et al. | |
| 7,751,858 B2 | 7/2010 | Chou | |
| 8,085,696 B2 | 12/2011 | Garg et al. | |
| 8,094,630 B2 | 1/2012 | Garg et al. | |
| 8,145,221 B2 | 3/2012 | Garg et al. | |
| 8,160,020 B2 | 4/2012 | Eyuboglu et al. | |
| 8,195,187 B2 | 6/2012 | Eyuboglu et al. | |
| 2001/0046863 A1 | 11/2001 | Rinne et al. | |
| 2002/0025820 A1 | 2/2002 | Fauconnier et al. | |
| 2002/0031107 A1 | 3/2002 | Li et al. | |
| 2002/0032034 A1 | 3/2002 | Tiedemann et al. | |
| 2002/0035699 A1 | 3/2002 | Crosbie | |
| 2002/0067707 A1 | 6/2002 | Morales et al. | |
| 2002/0068570 A1 | 6/2002 | Abrol et al. | |
| 2002/0082018 A1 | 6/2002 | Coskun | |
| 2002/0085719 A1 | 7/2002 | Crosbie | |
| 2002/0102976 A1 | 8/2002 | Newbury et al. | |
| 2002/0136226 A1 | 9/2002 | Christoffel et al. | |
| 2002/0145990 A1 | 10/2002 | Sayeedi | |
| 2002/0193110 A1 | 12/2002 | Julka et al. | |
| 2002/0196749 A1 | 12/2002 | Eyuboglu et al. | |
| 2003/0003913 A1 | 1/2003 | Chen et al. | |
| 2003/0026240 A1 | 2/2003 | Eyuboglu et al. | |
| 2003/0031201 A1 | 2/2003 | Choi | |
| 2003/0117948 A1 | 6/2003 | Ton et al. | |
| 2004/0008649 A1 | 1/2004 | Wybenga et al. | |
| 2004/0015607 A1 | 1/2004 | Bender et al. | |
| 2004/0038700 A1 | 2/2004 | Gibbs | |
| 2004/0068668 A1 | 4/2004 | Lor et al. | |
| 2004/0081111 A1 | 4/2004 | Bae et al. | |
| 2004/0203771 A1 | 10/2004 | Chang et al. | |
| 2004/0214574 A1 | 10/2004 | Eyuboglu et al. | |
| 2004/0218556 A1 | 11/2004 | Son et al. | |
| 2004/0224687 A1 | 11/2004 | Rajkotia | |
| 2004/0266436 A1 | 12/2004 | Jaakkola et al. | |
| 2005/0021616 A1 | 1/2005 | Rajahalm et al. | |
| 2005/0025116 A1 | 2/2005 | Chen et al. | |
| 2005/0036504 A1 | 2/2005 | Joshi et al. | |
| 2005/0053034 A1 | 3/2005 | Chiueh | |
| 2005/0111429 A1 | 5/2005 | Kim et al. | |
| 2005/0113117 A1 | 5/2005 | Bolin et al. | |
| 2005/0124343 A1 | 6/2005 | Kubo | |
| 2005/0148297 A1 | 7/2005 | Lu et al. | |
| 2005/0181795 A1 | 8/2005 | Mark et al. | |
| 2005/0207368 A1 | 9/2005 | Nam | |
| 2005/0213555 A1 | 9/2005 | Eyuboglu et al. | |
| 2005/0223097 A1 | 10/2005 | Ramsayer et al. | |
| 2005/0233746 A1 | 10/2005 | Laroia et al. | |
| 2005/0243749 A1 | 11/2005 | Mehrabanzad et al. | |
| 2005/0245279 A1 | 11/2005 | Mehrabanzad et al. | |
| 2006/0030323 A1 | 2/2006 | Ode et al. | |
| 2006/0126554 A1 | 6/2006 | Motegi et al. | |
| 2006/0126556 A1 | 6/2006 | Jiang et al. | |
| 2006/0146751 A1 | 7/2006 | Obuchi et al. | |
| 2006/0148460 A1 | 7/2006 | Mukherjee et al. | |
| 2006/0203766 A1 | 9/2006 | Kim et al. | |
| 2006/0209760 A1 | 9/2006 | Saito et al. | |
| 2006/0209882 A1 | 9/2006 | Han et al. | |
| 2006/0240782 A1 | 10/2006 | Pollman et al. | |
| 2006/0259628 A1 | 11/2006 | Vadlapudi et al. | |
| 2006/0291420 A1 | 12/2006 | Ng | |
| 2006/0294214 A1 | 12/2006 | Chou | |
| 2006/0294241 A1 | 12/2006 | Cherian et al. | |
| 2007/0022396 A1 | 1/2007 | Attar et al. | |
| 2007/0026884 A1 | 2/2007 | Rao | |
| 2007/0058628 A1 | 3/2007 | Palnati et al. | |
| 2007/0077948 A1 | 4/2007 | Sharma et al. | |
| 2007/0097916 A1 | 5/2007 | Eyuboglu et al. | |
| 2007/0099632 A1 | 5/2007 | Choksi | |
| 2007/0105527 A1 | 5/2007 | Nylander | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0153750 A1 | 7/2007 | Baglin et al. | |
| 2007/0155329 A1 | 7/2007 | Mehrabanzad et al. | |
| 2007/0160008 A1 | 7/2007 | Burgess | |
| 2007/0197220 A1 | 8/2007 | Willey | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0242648 A1 | 10/2007 | Garg et al. | |

(56) References Cited

U.S. PATENT DOCUMENTS

| | | | |
|---|---|---|---|
| 2007/0248042 A1 | 10/2007 | Harikumar et al. |
| 2008/0003988 A1 | 1/2008 | Richardson |
| 2008/0009328 A1 | 1/2008 | Narasimha |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0070574 A1 | 3/2008 | Vikberg et al. |
| 2008/0076398 A1 | 3/2008 | Mate et al. |
| 2008/0117842 A1 | 5/2008 | Rao |
| 2008/0119172 A1 | 5/2008 | Rao et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0287130 A1 | 11/2008 | Laroia et al. |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ramaswamy et al. |
| 2009/0172397 A1 | 7/2009 | Kim |
| 2009/0186626 A1 | 7/2009 | Raghothaman et al. |
| 2009/0191878 A1 | 7/2009 | Hedqvist et al. |
| 2009/0262697 A1 | 10/2009 | To et al. |
| 2009/0318162 A1 | 12/2009 | Chung et al. |
| 2010/0054219 A1 | 3/2010 | Humblet et al. |
| 2010/0075658 A1 | 3/2010 | Hou et al. |
| 2010/0085910 A1 | 4/2010 | Humblet |
| 2010/0157825 A1 | 6/2010 | Anderlind et al. |
| 2010/0157941 A1 | 6/2010 | Raghothaman et al. |
| 2010/0165957 A1 | 7/2010 | Hegde et al. |
| 2010/0165960 A1 | 7/2010 | Richardson |
| 2010/0167694 A1 | 7/2010 | Chiussi et al. |
| 2010/0167718 A1 | 7/2010 | Chiussi et al. |
| 2010/0167742 A1 | 7/2010 | Rajagopalan et al. |
| 2010/0167771 A1 | 7/2010 | Raghothaman et al. |
| 2010/0167777 A1 | 7/2010 | Raghothaman et al. |
| 2010/0167778 A1 | 7/2010 | Raghothaman et al. |
| 2010/0177731 A1 | 7/2010 | Ananthaiyer et al. |
| 2011/0032824 A1 | 2/2011 | Eyuboglu et al. |
| 2012/0243476 A1 | 9/2012 | Eyuboglu et al. |

FOREIGN PATENT DOCUMENTS

| | | |
|---|---|---|
| EP | 1751998 | 2/2007 |
| EP | 1896980 | 3/2008 |
| EP | 1897383 | 3/2008 |
| GB | 2447585 | 8/2008 |
| GB | 2452688 | 3/2009 |
| GB | 2447585 | 10/2010 |
| HK | 1101334 A | 10/2007 |
| JP | 2007-538476 | 12/2007 |
| JP | 2008-547329 | 12/2008 |
| JP | 2008-547358 | 12/2008 |
| JP | 5117188 B2 | 10/2012 |
| WO | WO 98/08353 | 2/1998 |
| WO | WO 98/09460 | 3/1998 |
| WO | WO01/86988 | 11/2001 |
| WO | WO03/001820 | 1/2003 |
| WO | WO 2003/043364 | 5/2003 |
| WO | WO03/054721 | 7/2003 |
| WO | WO2003/054721 | 7/2003 |
| WO | WO2005/115026 | 12/2005 |
| WO | WO 2007/002659 | 1/2007 |
| WO | WO 2007/044099 | 4/2007 |
| WO | WO2007/075446 | 7/2007 |
| WO | WO 2007/078766 | 7/2007 |
| WO | WO2007/078766 | 11/2011 |

OTHER PUBLICATIONS

USPTO Notice of Allowance in U.S. Appl. No. 11/303,774, dated Aug. 31, 2010, 4 pages.
Response filed Aug. 2, 2010 to Chinese office action for Chinese application No. 200580024230.0 dated May 17, 2010 (40 pages).
USPTO Final Office Action in U.S. Appl. No. 11/303,773, dated Aug. 18, 2010, 12 pages.
Fish & Richardson, P.C., Amendment in Reply to Action dated Mar. 30, 2010 in U.S. Appl. No. 11/402,744, filed Aug. 30, 2010, 12 pages.
Notice of Allowance in U.S. Appl. No. 11/303,774, dated Aug. 31, 2010, 4 pages.
International Search Report and Written Opinion for PCT international application No. PCT/US2006/024958, mailed Apr. 26, 2007 (12 pages).
International Search Report and Written Opinion for PCT international application No. PCT/US2005/017385, mailed Oct. 26, 2006 (22 pages).
International Search Report for PCT international application No. PCT/US2002/020380, mailed Oct. 29, 2002 (5 pages).
International Search Report and Written Opinion for PCT international application No. PCT/US2006/25018, mailed Jan. 29, 2008 (11 pages).
International Preliminary Report on Patentability for Application No. PCT/US2006/25018, Mar. 19, 2009 (8 pages).
International Preliminary Report on Patentability for Application No. PCT/US2005/017385, Dec. 7, 2006 (8 pages).
International Preliminary Report on Patentability for Application No. PCT/US2006/024958, Jan. 17, 2008 (7 pages).
EP Examination Report for Application No. 06785637.7, Feb. 6, 2008 (2 pages).
Australian (AU) Examination Report for Application No. 2005426813, Jun. 4, 2009 (18 pages).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
International Search Report and Written Opinion for PCT international application No. PCT/US2006/047524, mailed May 26, 2009 (13 pages).
U.S. Appl. No. 09/891,103, filed Jun. 25, 2001, including application as filed, and pending claims.
U.S. Appl. No. 10/848,597, filed May 18, 2004, now U.S. Patent No. 7,170,871, issued Jan. 30, 2007.
U.S. Appl. No. 11/640,619, filed Dec. 18, 2006, including application as filed, and pending claims.
U.S. Appl. No. 11/166,893, filed Jun. 24, 2005, including application as filed, and pending claims.
U.S. Appl. No. 11/037,896, filed Jan. 18, 2005, including application as filed, and pending claims.
U.S. Appl. No. 11/167,785, filed Jun. 27, 2005, including application as filed, and pending claims.
U.S. Appl. No. 11/243,405, filed Oct. 4, 2005, and pending claims.
U.S. Appl. No. 11/303,773, filed Dec. 16, 2005, including application as filed, and pending claims.
U.S. Appl. No. 11/305,286, filed Dec. 16, 2005, including application as filed, and pending claims.

(56) References Cited

OTHER PUBLICATIONS

U.S. Appl. No. 11/303,774, filed Dec. 16, 2005, including application as filed, and pending claims.
U.S. Appl. No. 11/402,744, filed Apr. 12, 2006, including application as filed, and pending claims.
U.S. Appl. No. 11/486,545, filed Jul. 14, 2006, including application as filed, and pending claims.
U.S. Appl. No. 11/955,644, filed Dec. 13, 2007, including application as filed, and pending claims.
Paul Bender, et al., "CDMA/HDR: A Bandwidth-Efficient High-Speed Wireless Data Service for Nomadic Users", IEEE Communications Magazine, Jul. 2000.
Paul Bender & Ramin Rezalifar, "Draft Baseline Text for the 1xEV-DO Upper Layers (excluding Physical Layer)", 3GPP2, Aug. 17, 2000.
3GPP2, "3GPP2 Access Network Interfaces Interoperability Specification 2, Release A," Jun. 2000.
TIA/EIA/TSB-115, "Wireless IP Architecture Based on IETF Protocols", Jun. 6, 2000.
3GPP2, "Wireless IP Network Standard", 3rd Generation Partnership Project 2 (3GPP2), Version 1.0.0, Jul. 14, 2000.
Goran Janevski, "IP-Based Mobile Wireless Access Network Architecture", Nortel Networks-MWIF Contribution, Draft dated Sep. 7, 2000.
3rd Generation Partnership Project "3GPP2", cdma2000 High Rate Packet Data Interface Specification, C.S0024-A, version 4.0, Oct. 25, 2002.
3rd Generation Partnership Project "3GPP2", cdma2000 High Rate Packet Data Interface Specification, C.S0024-A, version 1.0, Mar. 2004.
3rd Generation Partnership Project "3GPP2", cdma2000 High Rate Packet Data Interface Specification, C.S0024-A, version 2.0, Jul. 2005.
3rd Generation Partnership Project "3GPP2", cdma2000 High Rate Packet Data Interface Specification, C.S0024-B, version 1.0, Apr. 2006.
Rashid Attar et al., "Evolution of cdma2000 Cellular Networks: Multicarrier EV-DO", IEEE Communications Magazine, Mar. 2006. pp. 46-53.
Chinese Office action of Chinese application No. 200580024230.0 mailed Mar. 15, 2009 (13 pages).
EP Examination Report for Application No. 05750705.5, Jan. 9, 2007 (2 pages).
Office Action and response from European Patent Office for Application No. 06836082.5 mailed Jun. 18, 2009 and sent Jul. 21, 2009 (21 pages).
Chinese Office action response of Chinese application No. 200580024230.0 sent Jul. 22, 2009 (8 pages).
Chinese Office action Chinese application No. 200580024230.0 sent Nov. 20, 2009 with English translation (6 pages).
Chinese Office action response of Chinese application No. 200580024230.0 filed Feb. 5, 2010, along with instructions for response and associate recommendation (12 pages).
TIA/EIA/IS-2001, Interoperability Specification (IOS) for CDMA2000 Network Access Interfaces, Aug. 2001 (revised version of May 2000).
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-B, version 2, Mar. 2007 (1627 pages).
Library Search for Nortel and frequency handoff. Search results dated Aug. 28, 2009 (85 pages).
Chinese Office action of Chinese application No. 200580024230.0 mailed Nov. 20, 2009 (4 pages).
GB Examination Report for Application No. 0811839.0, mailed Jan. 22, 2010 (2 pages).
European Patent Office communication mailed Jun. 18, 2009 and response to Jun. 18, 2009 communication of European application No. 06836082.5 filed Jul. 21, 2009 (21 pages).
Chinese Office action with English translation of Chinese application No. 200580024230.0 dated May 17, 2010 (6 pages).
Response filed May 21, 2010 to GB Examination Report for Application No. 0811839.0, dated Jan. 22, 2010 (12 pages).
GB Examination Report for Application No. 0811839.0, mailed Jun. 3, 2010 (3 pages).
Fish & Richardson, P.C., Preliminary Amendment in U.S. Appl. No. 09/891,103, filed Aug. 1, 2004, 11 pages.
USPTO Non Final Office Action in U.S. Appl. No. 09/891,103, dated Jan. 28, 2005, 8 pages.
Fish & Richardson, P.C., Amendment in Reply to Action dated Jan. 28, 2005 in U.S. Appl. No. 09/891,103, filed Jul. 29, 2005, 28 pages.
USPTO Final Office Action in U.S. Appl. No. 09/891,103, dated Nov. 3, 2005, 11 pages.
Fish & Richardson, P.C., Amendment in Reply to Action dated Nov. 3, 2005 in U.S. Appl. No. 09/891,103, filed Mar. 3, 2006, 24 pages.
USPTO Non Final Office Action in U.S. Appl. No. 09/891,103, dated May 17, 2006, 10 pages.
Fish & Richardson, P.C., Amendment in Reply to Action dated May 17, 2006 in U.S. Appl. No. 09/891,103, filed Nov. 20, 2006, 30 pages.
USPTO Non Final Office Action in U.S. Appl. No. 09/891,103, dated Jun. 11, 2007, 23 pages.
Fish & Richardson, P.C., Amendment in Reply to Action dated Jun. 11, 2007 in U.S. Appl. No. 09/891,103, filed Nov. 2, 2007, 32 pages.
USPTO Final Office Action in U.S. Appl. No. 09/891,103, dated Jan. 31, 2008, 24 pages.
Fish & Richardson, P.C., Amendment in Reply to Action dated Jan. 31, 2008 in U.S. Appl. No. 09/891,103, filed May 12, 2008, 36 pages.
USPTO Advisory Action in U.S. Appl. No. 09/891,103, dated Jun. 5, 2008, 3 pages.
Fish & Richardson, P.C., Amendment in Reply to Action dated Jan. 31, 2008 in U.S. Appl. No. 09/891,103, filed Jun. 30, 2008, 36 pages.
Fish & Richardson, P.C., Supplemental Amendment in Reply to Action dated Jan. 31, 2008 in U.S. Appl. No. 09/891,103, filed Jul. 10, 2008, 36 pages.
USPTO Non Final Office Action in U.S. Appl. No. 09/891,103, dated Sep. 16, 2008, 26 pages.
Fish & Richardson, P.C., Supplemental Amendment in Reply to Action dated Sep. 16, 2008 in U.S. Appl. No. 09/891,103, filed Jan. 14, 2009, 39 pages.
USPTO Non Final Office Action in U.S. Appl. No. 09/891,103, dated Apr. 29, 2009, 27 pages.
Fish & Richardson, P.C., Amendment in Reply to Action dated Apr. 29, 2009 in U.S. Appl. No. 09/891,103, filed Jul. 29, 2009, 40 pages.
Notice of Allowance in U.S. Appl. No. 09/891,103, dated Nov. 10, 2009, 4 pages.
Notice of Allowance in U.S. Appl. No. 09/891,103, dated Feb. 17, 2010, 4 pages.
Notice of Allowance in U.S. Appl. No. 09/891,103, dated Jun. 14, 2010, 6 pages.
Non Final Office Action in U.S. Appl. No. 11/640,619, dated Nov. 2, 2009, 18 pages.
Fish & Richardson, P.C., Amendment in Reply to Action dated Nov. 2, 2009 in U.S. Appl. No. 11/640,619, filed Mar. 2, 2010, 13 pages.
Interview Summary in U.S. Appl. No. 11/640,619, dated Mar. 12, 2010, 3 pages.
Non Final Office Action in U.S. Appl. No. 11/640,619, dated Jun. 18, 2010, 20 pages.
Non Final Office Action in U.S. Appl. No. 11/166,893, dated Aug. 5, 2008, 41 pages.
Fish & Richardson, P.C., Amendment in Reply to Action dated Aug. 5, 2008 in U.S. Appl. No. 11/166,893, filed Dec. 4, 2008, 22 pages.
Final Office Action in U.S. Appl. No. 11/166,893, dated Mar. 5, 2009, 26 pages.
Fish & Richardson, P.C., Amendment in Reply to Action dated Mar. 5, 2009 in U.S. Appl. No. 11/166,893, filed Apr. 24, 2009, 19 pages.
Fish & Richardson, P.C., Amendment in Reply to Action dated Mar. 5, 2009 in U.S. Appl. No. 11/166,893, filed Apr. 30, 2009, 21 pages.
Non Final Office Action in U.S. Appl. No. 11/166,893, dated Aug. 4, 2009, 28 pages.

(56) References Cited

OTHER PUBLICATIONS

Fish & Richardson, P.C., Amendment in Reply to Action dated Aug. 4, 2009 in U.S. Appl. No. 11/166,893, filed Dec. 1, 2009, 23 pages.
Interview Summary in U.S. Appl. No. 11/166,893, dated Dec. 8, 2009, 3 pages.
Final Action in U.S. Appl. No. 11/166,893, dated Mar. 25, 2010, 30 pages.
Fish & Richardson, P.C., Amendment in reply to Action dated Mar. 25, 2010 in U.S. Appl. No. 11/166,893, dated Jun. 25, 2010, 19 pages.
Examiner Interview Summary in U.S. Appl. No. 11/166,893, dated Jun. 30, 2009, 4 pages.
Fish & Richardson, P.C., Amendment in Reply to Action dated Mar. 25, 2010 in U.S. Appl. No. 11/166,893, filed Jun. 28, 2010, 19 pages.
Non Final Office Action in U.S. Appl. No. 11/037,896, dated Nov. 21, 2007, 15 pages.
Fish & Richardson, P.C., Amendment in reply to Action dated Nov. 21, 2007 in U.S. Appl. No. 11/037,896, dated Feb. 21, 2008, 20 pages.
Final Office Action in U.S. Appl. No. 11/037,896, dated Jul. 10, 2008, 27 pages.
Non Final Office Action in U.S. Appl. No. 11/037,896, dated Feb. 5, 2009, 26 pages.
Fish & Richardson, P.C., Amendment in reply to Action dated Feb. 5, 2009 in U.S. Appl. No. 11/037,896, dated May 5, 2009, 26 pages.
Final Office Action in U.S. Appl. No. 11/037,896, dated Sep. 10, 2009, 29 pages.
Fish & Richardson, P.C., Amendment in reply to Action dated Sep. 10, 2009 in U.S. Appl. No. 11/037,896, dated Jan. 11, 2010, 26 pages.
Fish & Richardson, P.C., Amendment in reply to Action dated Jun. 16, 2010 in U.S. Appl. No. 11/037,896, dated Jun. 28, 2010, 21 pages.
Notice of Allowance in U.S. Appl. No. 11/037,896, dated Feb. 22, 2010, 6 pages.
Notice of Allowance in U.S. Appl. No. 11/037,896, dated Jun. 16, 2010, 5 pages.
Fish & Richardson, P.C., Amendment in reply to Action dated Jun. 16, 2010 in U.S. Appl. No. 11/037,896, dated Jun. 28, 2010, 24 pages.
Non Final Office Action in U.S. Appl. No. 11/167,785, dated Nov. 15, 2007, 7 pages.
Fish & Richardson, P.C., Amendment in reply to Action dated Nov. 15, 2007 in U.S. Appl. No. 11/167,785, dated Apr. 10, 2008, 14 pages.
Final Office Action in U.S. Appl. No. 11/167,785, dated Jul. 21, 2008, 10 pages.
Non Final Office Action in U.S. Appl. No. 11/167,785, dated Jun. 22, 2009, 9 pages.
Fish & Richardson, P.C., Amendment in reply to Action dated Jun. 22, 2009 in U.S. Appl. No. 11/167,785, dated Sep. 22, 2009, 18 pages.
Final Office Action in U.S. Appl. No. 11/167,785, dated Jan. 11, 2010, 11 pages.
Fish & Richardson, P.C., Amendment in reply to Action dated Jan. 11, 2010 in U.S. Appl. No. 11/167,785, dated Apr. 12, 2010, 16 pages.
Non Final Office Action in U.S. Appl. No. 11/167,785, dated Apr. 28, 2010, 9 pages.
USPTO Non-Final Office Action in U.S. Appl. No. 11/243,405, dated Jan. 30, 2008, 7 pages.
Fish & Richardson P.C., Amendment in Reply to Action dated Jan. 30, 2008 in U.S. Appl. No. 11/243,405, filed May 30, 2008, 9 pages.
USPTO Non-Final Office Action in U.S. Appl. No. 11/243,405, dated Jul. 10, 2008, 13 pages.
Fish & Richardson P.C., Reply to Action dated Jul. 10, 2008 in U.S. Appl. No. 11/243,405, filed Dec. 10, 2008, 8 pages.
USPTO Final Office Action in U.S. Appl. No. 11/243,405, dated Feb. 12, 2009, 14 pages.
Fish & Richardson P.C., Amendment in Reply to Action dated Jan. 12, 2009 in U.S. Appl. No. 11/243,405, filed Apr. 10, 2009, 14 pages.
USPTO Advisory Action in U.S. Appl. No. 11/243,405, dated Apr. 23, 2009, 3 pages.
USPTO Advisory Action in U.S. Appl. No. 11/243,405, dated May 13, 2009, 3 pages.
USPTO Non-Final Office Action in U.S. Appl. No. 11/243,405, dated Jun. 22, 2009, 11 pages.
Fish & Richardson P.C., Notice of Appeal and Pre-Appeal Brief Request for Review in U.S. Appl. No. 11/243,405, filed Sep. 22, 2009, 6 pages.
USPTO Notice of Panel Decision from Pre-Appeal Brief Review in U.S. Appl. No. 11/243,405, dated Oct. 22, 2009, 2 pages.
USPTO Interview Summary in U.S. Appl. No. 11/243,405, dated Nov. 5, 2009, 3 pages.
USPTO Notice of Allowance in U.S. Appl. No. 11/243,405, dated Jan. 6, 2010, 4 pages.
USPTO Non-Final Office Action in U.S. Appl. No. 11/303,773, dated Apr. 2, 2008, 11 pages.
Fish & Richardson P.C., Amendment in Reply to Action dated Apr. 2, 2008 in U.S. Appl. No. 11/303,773, filed Aug. 4, 2008, 19 pages.
USPTO Final Office Action in U.S. Appl. No. 11/303,773, dated Oct. 22, 2008, 14 pages.
Fish & Richardson P.C., Amendment in Reply to Action dated Oct. 22, 2008 in U.S. Appl. No. 11/303,773, filed Feb. 23, 2009, 16 pages.
USPTO Interview Summary in U.S. Appl. No. 11/303,773, dated Feb. 26, 2009, 2 pages.
USPTO Non-Final Office Action in U.S. Appl. No. 11/303,773, dated Mar. 13, 2009, 14 pages.
Fish & Richardson P.C., Reply to Action dated Mar. 13, 2009 in U.S. Appl. No. 11/303,773, filed Aug. 13, 2009, 22 pages.
USPTO Final Office Action in U.S. Appl. No. 11/303,773, dated Nov. 18, 2009, 14 pages.
Fish & Richardson P.C., Amendment in Reply to Action dated Nov. 18, 2009 in U.S. Appl. No. 11/303,773, filed Feb. 18, 2010, 22 pages.
USPTO Non-Final Office Action in U.S. Appl. No. 11/303,773, dated Mar. 11, 2010, 14 pages.
Fish & Richardson P.C., Reply to Action dated Mar. 11, 2010 in U.S. Appl. No. 11/303,773, filed Jun. 11, 2010, 23 pages.
USPTO Non-Final Office Action in U.S. Appl. No. 11/305,286, dated Oct. 8, 2008, 12 pages.
Fish & Richardson P.C., Amendment in Reply to Action dated Oct. 8, 2008 in U.S. Appl. No. 11/305,286, filed Feb. 27, 2009, 25 pages.
USPTO Final Office Action in U.S. Appl. No. 11/305,286, dated Jun. 1, 2009, 22 pages.
Fish & Richardson P.C., Amendment in Reply to Action dated Jun. 1, 2009 in U.S. Appl. No. 11/305,286, filed Sep. 30, 2009, 27 pages.
USPTO Non-Final Office Action in U.S. Appl. No. 11/305,286, dated Dec. 30, 2009, 27 pages.
Fish & Richardson P.C., Amendment in Reply to Action dated Dec. 30, 2009 in U.S. Appl. No. 11/305,286, filed Mar. 30, 2010, 31 pages.
USPTO Final Office Action in U.S. Appl. No. 11/305,286, dated Jun. 24, 2010, 39 pages.
USPTO Non-Final Office Action in U.S. Appl. No. 11/303,774, dated Apr. 4, 2008, 8 pages.
Fish & Richardson P.C., Amendment in Reply to Action dated Apr. 4, 2008 in U.S. Appl. No. 11/303,774, filed Aug. 29, 2008, 13 pages.
USPTO Non-Final Office Action in U.S. Appl. No. 11/303,774, dated Nov. 20, 2008, 8 pages.
Fish & Richardson P.C., Amendment in Reply to Action dated Nov. 20, 2008 in U.S. Appl. No. 11/303,774, filed Mar. 19, 2009, 12 pages.
USPTO Final Office Action in U.S. Appl. No. 11/303,774, dated Jun. 12, 2009, 8 pages.
Fish & Richardson P.C., Amendment in Reply to Action dated Jun. 12, 2009 in U.S. Appl. No. 11/303,774, filed Aug. 13, 2009, 15 pages.
USPTO Non-Final Office Action in U.S. Appl. No. 11/303,774, dated Sep. 10, 2009, 9 pages.
Fish & Richardson P.C., Amendment in Reply to Action dated Sep. 10, 2009 in U.S. Appl. No. 11/303,774, filed Dec. 10, 2009, 18 pages.
USPTO Final Office Action in U.S. Appl. No. 11/303,774, dated Mar. 10, 2010, 9 pages.
Fish & Richardson P.C., Amendment in Reply to Action dated Mar. 10, 2010 in U.S. Appl. No. 11/303,774, filed Jun. 10, 2010, 14 pages.
Advisory Action in U.S. Appl. No. 11/303,774, dated Jun. 30, 2 pages.
USPTO Non-Final Office Action in U.S. Appl. No. 11/402,744, dated Oct. 8, 2008, 14 pages.
Fish & Richardson P.C., Amendment in Reply to Action dated Oct. 8, 2008 in U.S. Appl. No. 11/402,744, filed Jan. 8, 2009, 15 pages.
USPTO Non-Final Office Action in U.S. Appl. No. 11/402,744, dated Apr. 17, 2009, 14 pages.

(56) References Cited

OTHER PUBLICATIONS

Fish & Richardson P.C., Amendment in Reply to Action dated Apr. 17, 2009 in U.S. Appl. No. 11/402,744, filed Aug. 17, 2009, 12 pages.
USPTO Final Office Action in U.S. Appl. No. 11/402,744, dated Nov. 25, 2009, 13 pages.
Fish & Richardson P.C., Amendment in Reply to Action dated Nov. 25, 2009 in U.S. Appl. No. 11/402,744, filed Feb. 25, 2010, 14 pages.
USPTO Non-Final Office Action in U.S. Appl. No. 11/402,744, dated Mar. 30, 2010, 14 pages.
USPTO Non-Final Office Action in U.S. Appl. No. 11/486,545, dated Aug. 19, 2009, 17 pages.
Fish & Richardson P.C., Amendment in Reply to Action dated Aug. 19, 2009 in U.S. Appl. No. 11/486,545, filed Nov. 19, 2009, 24 pages.
Fish & Richardson P.C., Supplemental Amendment in Reply to Action dated Aug. 19, 2009 in U.S. Appl. No. 11/486,545, filed Nov. 20, 2009, 24 pages.
USPTO Final Office Action in U.S. Appl. No. 11/486,545, dated Jan. 29, 2010, 13 pages.
Fish & Richardson P.C., Amendment in Reply to Action dated Jan. 29, 2010 in U.S. Appl. No. 11/486,545, filed Apr. 29, 2010, 19 pages.
USPTO Advisory Action in U.S. Appl. No. 11/486,545, dated May 7, 2010, 3 pages.
USPTO Notice of Allowance in U.S. Appl. No. 11/486,545, dated Jul. 28, 2010, 8 pages.
USPT Non-Final Office Action in U.S. Appl. No. 11/955,644, dated Mar. 24, 2009, 16 pages.
Fish & Richardson, P.C., Amendment in Reply to Action dated Mar. 24, 2009 in U.S. Appl. No. 11/955,644, filed Jul. 24, 2009, 19 pages.
USPTO Notice of Informal or Non-Responsive Amendment in U.S. Appl. No. 11/955,644, dated Nov. 19, 2009, 6 pages.
Fish & Richardson, P.C., Amendment in Reply to Action dated Nov. 11, 2009 in U.S. Appl. No. 11/955,644, filed Nov. 11, 2009, 19 pages.
USPTO Final Office Action in U.S. Appl. No. 11/955,644, dated Feb. 3, 2010, 17 pages.
Fish & Richardson, P.C., Amendment in Reply to Action dated Feb. 3, 2010 in U.S. Appl. No. 11/955,644, filed May 3, 2010, 18 pages.
USPTO Advisory Action in U.S. Appl. No. 11/955,644, dated May 13, 2010, 3 pages.
Response filed Aug. 9, 2010 to GB Examination Report for Application No. 0811839.0, dated Jun. 3, 2010 (10 pages).
Fish & Richardson, P.C., Supplemental Amendment in Reply to Action dated Jun. 18, 2010 in U.S. Appl. No. 11/640,619, filed Oct. 18, 2010, 20 pages.
USPTO Final Office Action in U.S. Appl. No. 11/167,785, dated Oct. 15, 2010, 10 pages.
USPTO Supplemental Notice of Allowance in U.S. Appl. No. 09/891,103, dated Oct. 15, 2010, 4 pages.
Fish & Richardson, P.C., Amendment in Reply to Action dated Jun. 24, 2010 in U.S. Appl. No. 11/305,286, filed Oct. 25, 2010, 31 pages.
USPTO Final Office Action in U.S. Appl. No. 11/402,744, dated Nov. 12, 2010, 22 pages.
Supplemental Notice of Allowability in U.S. Appl. No. 11/303,774, dated Nov. 22, 2010, 9 pages.
Notice of Allowability in U.S. Appl. No. 11/486,545, dated Nov. 8, 2010, 6 pages.
Notice of Allowance in U.S. Appl. No. 11/303,774, dated Dec. 21, 2010, 8 pages.
Examiner Interview Summary in U.S. Appl. No. 11/166,893, dated Dec. 17, 2010, 3 pages.
Final Office Action in U.S. Appl. No. 11/640,619, dated Jan. 7, 2011, 24 pages.
Notice of Allowance in U.S. Appl. No. 11/037,896, dated Jan. 5, 2011, 5 pages.
Notice of Allowance in U.S. Appl. No. 11/303,773, dated Dec. 30, 2010, 9 pages.
Fish & Richardson, P.C., Amendment in Reply to Final Office Action dated Nov. 12, 2010 in U.S. Appl. No. 11/402,744, filed Feb. 14, 2011, 12 pages.
Japanese Office action of application No. 2007-527408 issued Nov. 24, 2010, mailed Nov. 29, 2010 with English translation (21 pages).
Fish & Richardson, P.C., Amendment in Reply to Office Action dated Sep. 2, 2010 in U.S. Appl. No. 11/166,893, filed Jan. 3, 2011, 18 pages.
USPTO Notice of Allowance in U.S. Appl. No. 11/166,893, dated Mar. 18, 2011, 21 pages.
Notice of Allowability in U.S. Appl. No. 11/486,545, dated Mar. 11, 2011, 9 pages.
USPTO Supplemental Notice of Allowance in U.S. Appl. No. 09/891,103, dated Mar. 14, 2011, 6 pages.
USPTO Non-Final Office Action in U.S. Appl. No. 11/402,744, dated Apr. 1, 2011, 14 pages.
Notice of Allowance in U.S. Appl. No. 11/303,774, dated Apr. 4, 2011, 7 pages.
Notice of Allowance in U.S. Appl. No. 11/303,773, dated Apr. 15, 2011, 6 pages.
USPTO Supplemental Notice of Allowance in U.S. Appl. No. 11/166,893, dated Apr. 22, 2011, 17 pages.
International Preliminary Report on Patentability for PCT international application No. PCT/US2006/047524, mailed Apr. 28, 2011 (8 pages).
Notice of Allowance in U.S. Appl. No. 11/037,896, dated May 17, 2011, 8 pages.
Response filed May 30, 2011 to Japanese Office action issued in application No. 2007-527408, Nov. 24, 2010, mailed Nov. 29, 2010 (31 pages).
Fish & Richardson, P.C., Amendment in Reply to Office Action dated Apr. 1, 2011 in U.S. Appl. No. 11/402,744, filed Jun. 30, 2011, 13 pages.
USPTO Final Office Action in U.S. Appl. No. 11/402,744, dated Oct. 6, 2011, 14 pages.
USPTO Notice of Appeal Decision in U.S. Appl. No. 11/167,785, dated May 3, 2011, 2 pages.
Fish & Richardson, P.C., Response to Notice of Appeal Decision dated May 3, 2011 in U.S. Appl. No. 11/167,785, filed Nov. 3, 2011, 13 pages.
Japanese Office action issued in application No. 2007-527408 on Nov. 11, 2011, mailed Nov. 16, 2011 (5 pages).
Fish & Richardson, P.C., Response to Final Office Action dated Oct. 6, 2011 in U.S. Appl. No. 11/402,744, filed Jan. 6, 2012, 13 pages.
USPTO Non Final Office Action in U.S. Appl. No. 11/955,644, dated May 4, 2012, 17 pages.
European Patent Office communication from European application No. 06785637.7 mailed Apr. 27, 2012 (2 pages).
Fish & Richardson, P.C., Response to Notice of Panel Decision from Pre-Appeal Brief Review dated Feb. 23, 2012 in U.S. Appl. No. 11/402,744, filed May 23, 2012, 11 pages.
Response to Japanese Office action issued in application No. 2007-527408 on Nov. 11, 2011, mailed Nov. 16, 2011, response filed May 16, 2012 (26 pages).
USPTO Non Final Office Action in U.S. Appl. No. 11/167,785, dated Jun. 7, 2012, 9 pages.
Fish & Richardson, P.C., Response to Non Final Office Action dated May 4, 2012 in U.S. Appl. No. 11/955,644, filed Aug. 3, 2012, 14 pages.
Supplemental Search Report from European Application No. 05750705.5 issued Aug. 2, 2012 (102 pages).
Fish & Richardson, P.C., Response to Non Final Office Action dated Jun. 7, 2012 in U.S. Appl. No. 11/167,785, filed Sep. 6, 2012, 11 pages.
USPTO Final Office Action in U.S. Appl. No. 11/955,644, dated Sep. 21, 2012, 22 pages.
Fish & Richardson, P.C., Response to Final Office Action dated Sep. 21, 2012 in U.S. Appl. No. 11/955,644, filed Dec. 20, 2012, 16 pages.
USPTO Non Final Office Action in U.S. Appl. No. 13/430,422, dated Dec. 7, 2012, 6 pages.
Fish & Richardson, P.C., Response to Non Final Office Action dated Dec. 7, 2012 in U.S. Appl. No. 13/430,422, filed Mar. 4, 2013, 9 pages.
Examination Report from European Application No. 05750705.5 issued Mar. 11, 2013 (9 pages).
Response to European Patent Office communication from European application No. 06785637.7 mailed Apr. 27, 2012, filed Jun. 24, 2012, 3 pages.

(56) References Cited

OTHER PUBLICATIONS

European Search Report from European Application no. 06836082.5 mailed Apr. 26, 2013 (80 pages).
USPTO Final Office Action in U.S. Appl. No. 13/430,422, dated May 31, 2013, 12 pages.
Supplemental European Search Report from European Application No. 06836082.5 mailed May 15, 2013 (1 page).
USPTO Non Final Office Action in U.S. Appl. No. 11/167,785, dated Jun. 13, 2013, 10 pages.

* cited by examiner

RADIO NETWORK CONTROL

CROSS-REFERENCE TO RELATED APPLICATIONS

This application is a continuation application of U.S. application Ser. No. 11/037,896, filed on Jan. 18, 2005, which is a continuation-in-part application of U.S. application Ser. Nos. 09/891,103, filed on Jun. 25, 2001 and Ser. No. 10/848,597, filed on May 18, 2004, now U.S. Pat. No. 7,170,871, issued on Jan. 30, 2007. The following applications are hereby incorporated by reference into this application as if set forth herein in full: U.S. application Ser. Nos. 11/037,896, 09/891,103, and 10/848,597, now U.S. Pat. No. 7,170,871.

TECHNICAL FIELD

This description relates to radio network control.

BACKGROUND

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for IP packet data services that can deliver a shared forward link transmission rate of up to 2.46 Mbit/s per sector using only (1X) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," $3^{rd}$ Generation Partnership Project 2 (3GPP2), Version 1.0, Jul. 14, 2000), HDR networks can be built entirely on IP technologies, all the way from the mobile Access Terminal (AT) to the global Internet, thus taking full advantage of the scalability, redundancy and low-cost of IP networks.

HDR has been adopted by TIA (Telecommunications Industry Association) as a new standard in the CDMA2000 family, an EVolution of the current 1xRTT standard for high-speed data-only (DO) services, formally referred to as HRPD (High Rate Packet Data), also known as 1xEV-DO or IS-856.

IS-856 systems are typically implemented using the radio access network architecture shown in FIG. 1. Here the Access Terminal (AT) 10 may be a laptop computer, a Personal Digital Assistant (PDA), a dual-mode voice/data handset, or another device, with built-in IS-856 support.

The entire administrative service area of a wireless access provider may be divided into one or more subnetworks (or subnets) 12, 14. Each subnet 12 includes a set of Radio Nodes (RN's) 16, 18 and one or more Radio Network Controllers (RNC) 20, 22. The RN's are connected to RNC's over a backhaul network 24. In existing 2G and 3G wireless networks, each RN is connected to only one RNC using dedicated leased lines or ATM permanent virtual circuits (PVC's). Further, RNC's are connected to each other using dedicated leased lines or ATM PVC's. In a new generation of IP-based radio access networks, the backhaul can be implemented using a shared IP or metropolitan Ethernet network which supports many-to-many connectivity between RN's and RNC's.

Each RNC typically controls 25-100 RN's. Each RN typically supports 1-4 carriers each of 1.25 MHz of bandwidth. Further, each cell area (not shown) is typically divided into multiple sectors (typically 3 or 6) and the RN has one radio transceiver 27 for each sector.

Each RNC is connected over an IP network 26 to one or more Packet Data Serving Node's (PDSN's) 28 (see TIA references cited earlier). The RNC communicates with the PDSN over a standard interface termed the R-P (Radio-Packet) interface 30. The R-P interface is further broken into two interfaces: the A10 interface used to carry data and the A11 interface used to carry signaling. A PDSN can be viewed as an edge router that supports mobility; it maintains link layer connectivity to AT's through the Access Network. The PDSN also interfaces to AAA servers 32 for Authentication, Authorization, and Accounting (AAA).

Once an AT connects to the network, it establishes session with an RNC and receives a link layer address from the RNC. The session represents all the information the RNC needs to serve the AT. In IS-856 radio access networks as currently defined by 3GPP2 in 1xEV-DO IOS Phase 1 (IS-878), each RN is uniquely associated with an RNC and each subnet contains only one RNC. As a result, when an AT moves from the coverage area of one RNC to the coverage area of another, the AT performs a handoff, which includes a session transfer.

Every time a dormant AT crosses a subnet boundary, the AT initiates a dormant handoff by sending a UATI_Request. The AT recognizes the need for a dormant handoff by monitoring the 128-bit SectorID being broadcast by the sectors. All sectors that belong to the same subnet have SectorID's that fall within a certain range. The 128-bit Universal Access Terminal Identifier (UATI) assigned to an AT in a given subnet falls within the same range. When the AT moves into the coverage area of another subnet, the AT compares its UATI with the SectorID being broadcast by its serving sector. When these do not belong to the same range, the AT knows that it has crossed a subnet boundary and initiates the dormant handoff by sending a UATI_Request.

A first purpose of a dormant handoff is to inform the PDSN to send packets arriving for that AT to the new serving RNC. Dormant handoffs involve a relocation of the R-P (A10) session from the old serving RNC to the new serving RNC. Without such handoffs, the PDSN would send packets to an old serving RNC. Since the old serving RNC does not know the location of the AT outside its subnet, AT's packets may be lost.

A second purpose of a dormant handoff is to transfer session information between RNC's. In IS-856, each RNC maintains certain session information about the AT. Such session information is needed for communication over the air interface. Session information includes the Universal Access Terminal Identifier (UATI), security keys for access channel authentication and encryption, and other protocol constants. Every time the AT crosses an RNC boundary (in this case a subnet), a new UATI needs to be assigned to the AT and the remaining session information needs to be transferred from the old serving RNC to the new serving RNC. Such a transfer requires a network link between the RNC's. Without such session transfer, every handoff between RNC's would result in a new and lengthy session establishment, taking up precious air resources and causing delays. When the footprint of an RNC is small, dormant handoffs occur frequently, resulting in excessive use of airlink resources (for the new UATI assignment), extra processing for the RNC's to implement the session transfer, and extra processing for the RNC and PDSN to relocate the A10 connection.

SUMMARY

In one aspect, the invention features a method for exchanging digital information using mobile access terminals in a wireless network. The method includes transmitting packets over a first traffic channel, established between a first mobile access terminal and a first radio network controller, via a first radio node without passing through a second radio network controller, and transmitting packets over a second traffic channel, established between a second mobile access terminal and the second radio network controller, via a second radio node without passing through the first radio network controller. The method also maintains the first traffic channel between the first access terminal and the first radio network controller when packets are received from or transmitted to the first access terminal via the second radio node. The method also includes transmitting packets received from the first access terminal to an external network (e.g., the Internet).

Implementations may include one or more of the following features. The method may also include performing an active handoff of the first traffic channel from the first radio network controller to the second radio network controller upon detecting that the first access terminal is near a third radio node. The method may also include closing the first traffic channel by the first radio network controller upon detecting that the first access terminal is near a third radio node.

The method may also include establishing a first session for a third mobile access terminal on the first radio network controller via the first radio node, keeping track of the approximate location of the third access terminal based on location update messages sent by the access terminal, receiving packets at the first radio network controller for the third access terminal while it is in a dormant state, sending the second radio controller a message requesting that it page the third access terminal, and paging the access terminal from the second radio network controller via a third radio node. The method may also include receiving at the third radio node a traffic channel request message from the third mobile access terminal over an access channel, forwarding the traffic channel request message from the third radio node to the second radio network controller, performing a handoff of the first session from the first radio network controller to the second radio network controller, and, after completing the handoff, establishing a traffic channel between the second radio network controller and the third access terminal.

A radio network controller (e.g., the first radio network controller) may include multiple server cards, and the method may also include establishing the first traffic channel between the radio network controller and the first mobile access terminal on one of a server card selected from the plurality of server cards, sending an address of the selected server card from the radio network controller to the first radio node, sending reverse link traffic channel packets from the first radio node to the address of the selected server card, sending the address of the selected server card from the first radio network controller to the second radio node, and sending reverse link traffic channel packets from the second radio node to the address of the selected server card.

The first radio node may be configured to operate on a first frequency channel while the second radio node may be co-located with the first radio node and configured to operate on a second frequency channel. The method may also include establishing a first session for the first mobile access terminal on the first radio network controller via the first radio node operating on the first frequency channel, establishing a second session for the second mobile access terminal on the second radio network controller via the second radio node operating on the second frequency channel, and establishing a third session for a third mobile access terminal on the first radio network controller via the second radio node operating on the second frequency channel.

The method may also include establishing a primary association between the first radio node operating on the first frequency channel and the first radio network controller, establishing a secondary association between the second radio node operating on the second frequency channel and the first radio network controller, establishing a first session for the first mobile access terminal on the first radio network controller via the first radio node operating on the first frequency channel, and transferring the first session to the second radio network controller, whenever an access terminal starts monitoring the second radio node in a dormant mode.

The method may also include receiving a connection request from the first mobile access terminal in the first radio network controller via the first radio node operating on the first frequency channel, and establishing a third traffic channel for the first access terminal on the first radio network controller, wherein the traffic channel flowing via the second radio node operating on the second frequency channel.

The method may also include establishing the third traffic channel flowing via the second radio node operating on the second frequency channel based on actual load information received by the first radio network controller from the first and second radio node. The method may also include establishing a third traffic channel flowing via the second radio node operating on the second frequency channel based on an estimate of load on the first and second radio nodes.

The first and second radio network controllers may each include a plurality of server cards, and the method may further include handling a plurality of traffic channels on a first server card in the first radio network controller, detecting an overload condition in the first server card, selecting a traffic channel served on the first server card for transfer to another server card, and transferring the selected traffic channel to another server card in one of the radio network controllers without dropping the traffic channel.

Selection of the traffic channel for transfer may be based at least partially on the amount of processing resources used by the selected traffic channel and/or on a quality-of-service requirement of the traffic on the plurality of traffic channels. Determination of a target server card to transfer the selected traffic channel to based at least partially on load and availability of other cards in the radio network controllers. A target server card may be located in the same or a different radio network controller as the first server card.

Information about the load of server cards in one or more radio network controllers may be provided by a centralized load tracker that is located within a radio network controller or is external to all of the radio network controllers. A centralized load tracker may be configured to trigger a transfer of a traffic channel from the first server card to the target server card. In some implementations, load information may be obtained by a server card directly from other server cards.

The method may also include using an Internet Protocol network to exchange data packets between the first radio network controllers and the first and second radio nodes.

In another aspect, the invention features a radio access network for wirelessly communicating with mobile access terminals that includes a plurality of radio nodes interconnected with a plurality of radio network controllers using a network (e.g., an IP network), wherein each said radio node can address each said radio network controller and each said radio network controller can address each said radio node, and an interface for exchanging packets between the radio access network and an external network.

Implementations may include one or more of the following features. The radio nodes and radio network controllers may be associated with a common sub-network. Each radio network controller may be configured to maintain a traffic channel regardless of which radio node the traffic channel is flowing. The radio network controllers may maintain a traffic channel by routing packets to and from the access terminal via any one of the radio nodes. Each radio node may be associated with a primary radio network controller selected from the plurality of radio network controllers and each of the radio network controllers may be enabled to send a paging message to an access terminal via any of the radio nodes.

Each radio network controller may include a multiple server cards, each connected to the network and addressable by each of the radio nodes. The radio network controller may be configured to establish traffic channels with access terminals on each of the plurality of server cards. The radio network controller may also be configured to provide an address of a server card on which a traffic channel is established to one or more radio nodes. Each radio network controller may also be configured to detect an overload condition in one of its plurality of server cards and select one or more traffic channels handled by an overloaded card for transfer to another card The plurality of radio nodes may include a two co-located radio nodes, with a first radio node configured to operate on a first frequency channel, and a second radio node configured to operate on a second frequency channel.

The interface may be a packet data switching node or may be part of one of the radio network controllers.

DETAILED DESCRIPTION

In a radio access network (RAN) multiple radio network controllers (RNCs) act as a pool of resources that collectively serve multiple radio nodes. For example, RNCs and RNs in a RAN can be linked using an Internet Protocol-based network, which allows RNs to address different RNCs within the RAN and visa versa. Load balancing mechanisms within the RAN to balance load among RNCs within the RAN as well as among server cards within a single RNC can be used. By pooling RNCs within a RAN, costly handoffs between RNCs as an access terminal (AT) moves across the RAN can be reduced, and, in some cases eliminated. The following disclosure describes several implementations of IP-based radio access networks in which RNCs are clustered together to form a pool of resources serving multiple radio nodes within a RAN.

IP-Based Radio Access Network Architecture with Inter-RNC Signaling

Figure 1:
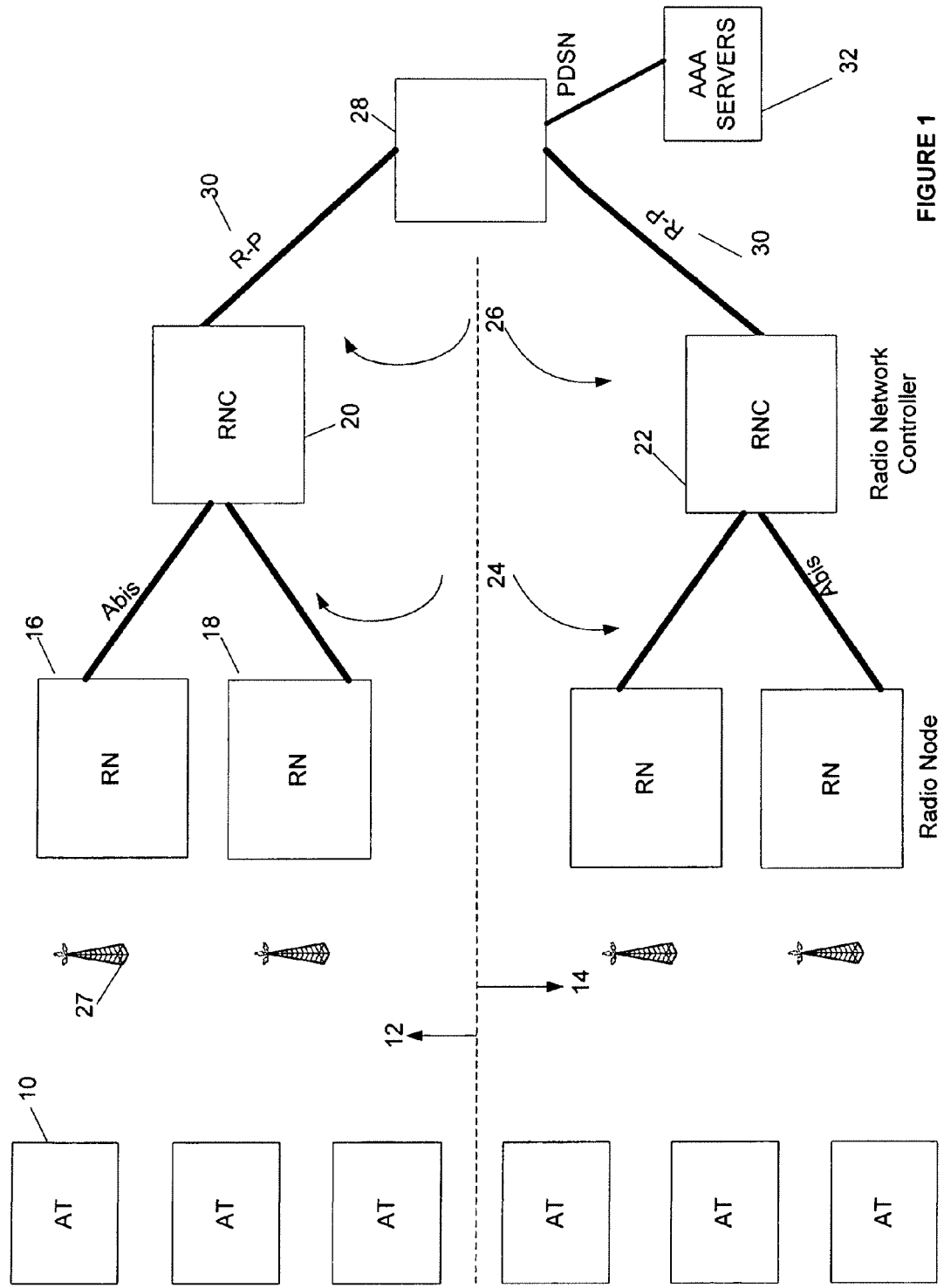
FIGS. 1 through 4 show networks.
Figure 2:
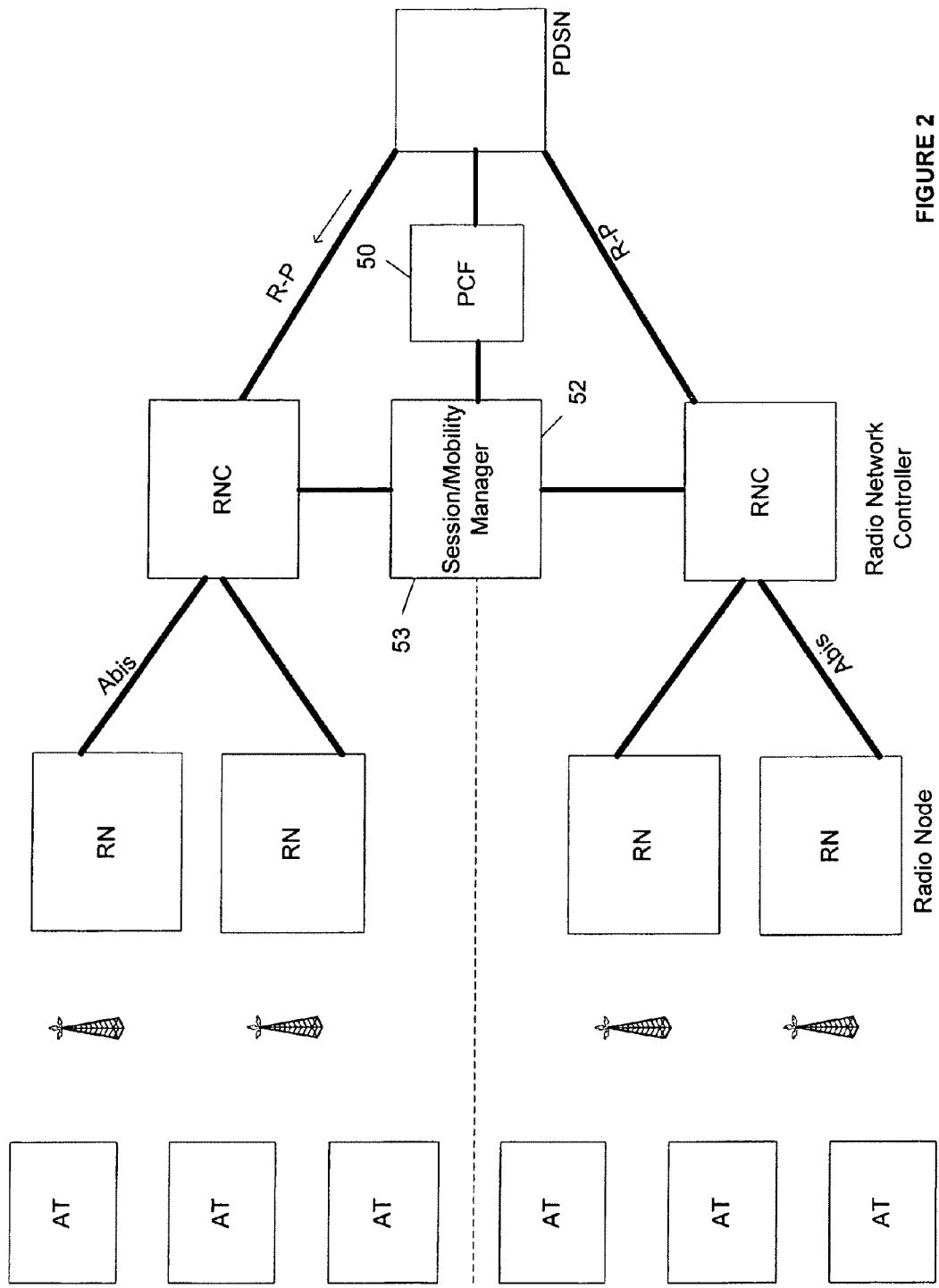
Figure 3:
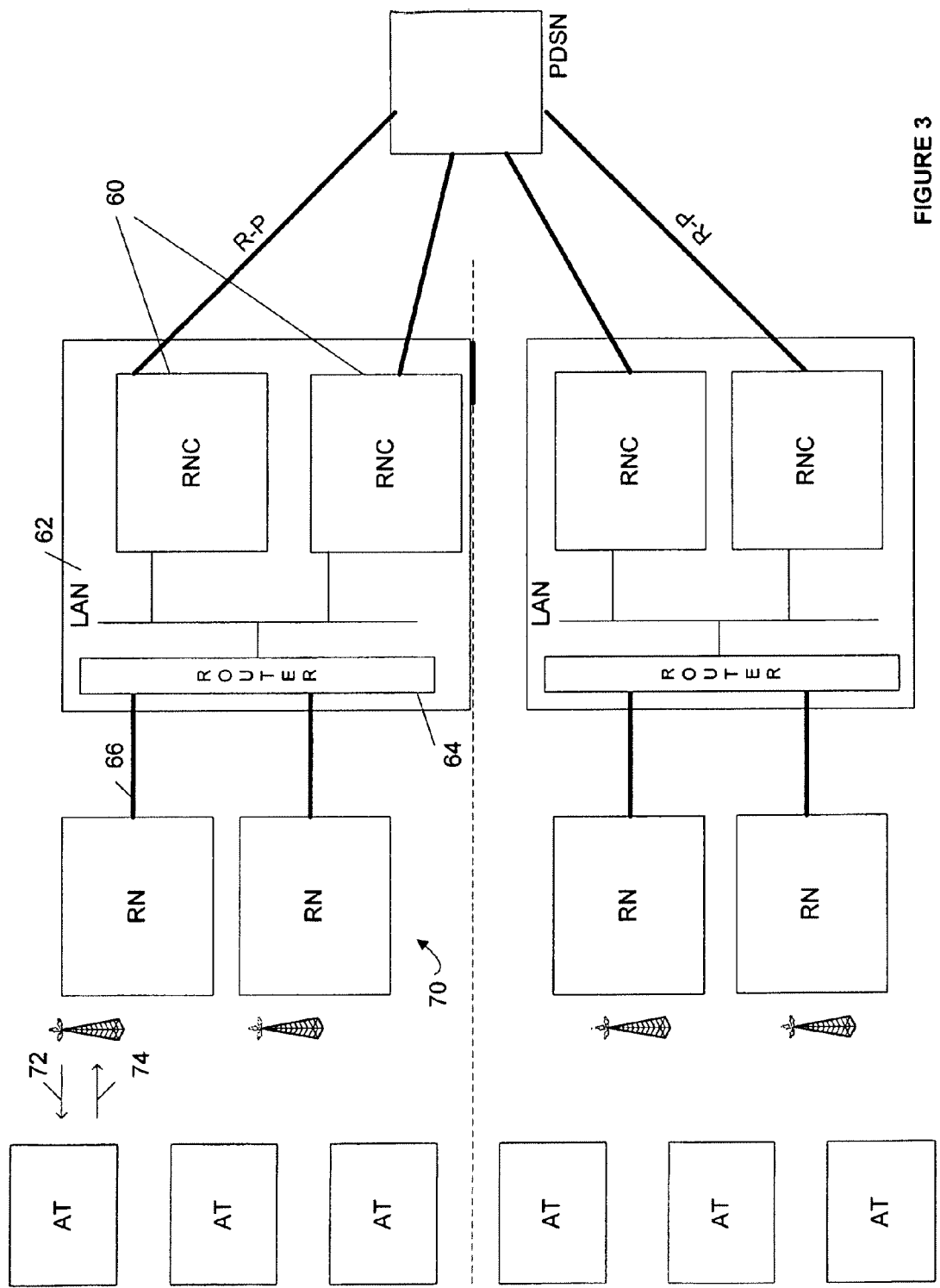

Referring to FIG. 3, a set of RNC's 60 are co-located in a data center and connected together via a high-speed Local Area Network (LAN) 62 such as a Gigabit Ethernet LAN. The RNCs connect to the network via LAN interfaces and a router 64 provides connectivity to an external network. Such a configuration can be referred to as an RNC cluster (or pool) since several RNCs are co-located at a data center. (The description below describes how the same concept can be extended to RNC's connected over a larger IP network, such as a metropolitan-area network.) RNs connect to the router 64 in the data center using dedicated leased lines 66. It is assumed that RN's and RNC's are all IP addressable, meaning that an RN served by the RNC cluster can communicate directly at the IP level with any of the RNCs in the cluster.

The RNCs in the RNC cluster are pooled together to logically operate as a single, large RNC, which advantageously reduces handoffs between RNCs within the cluster as an Access Terminal moves from sector to sector.

To logically operate the RNCs in the cluster as a single logical RNC, a 1xEV-DO subnet 70 is defined to be the entire footprint of the RNC cluster, not the footprint of one RNC. In other words, all RNs served by the cluster belong to the same subnet. Each RN in the subnet is primarily associated with one RNC in the cluster. This association is established when an RN is first powered.

Access Channel Packet Routing

Each sector in an RN can transmit to an AT over the forward traffic channel or control channel, collectively represented by line 72 in FIG. 3. Similarly, each sector in an RN can receive from an AT over the reverse traffic channel or access channel, collectively represented by line 74. The access channel and the reverse traffic channel are separated by code division multiplexing using a Long Code Mask, whereas the control channel and the forward traffic channel are separated by time-division multiplexing using a preamble. The preamble identifies a forward link physical layer packet as a control channel packet or as a traffic channel packet associated with a certain (Media Access Control) MAC Index. A MAC Index, an integer between 0 and 63, is unique within a sector and is assigned to the channels by the RN at the time a traffic channel is established. Similarly, the Long Code Mask identifies a reverse link physical layer packet as an access channel packet or a specific traffic channel packet. The Long Code Mask is based on the AT's UATI for the traffic channel and the SectorID of the serving sector for the access channel. The sending AT of an access channel packet and the recipient AT of a control channel packet are indicated in the ATI field of a MAC Layer header.

Whenever an RN receives a MAC Layer packet on one of its access channels, the RN forwards the packet, without looking at its content, to its primary RNC in the cluster. As such, when a packet carrying a UATI_Request message is received from an AT, the packet is forwarded by the receiving RN to its primary RNC. More particularly, The RN encapsulates the MAC Layer packet in an IP packet (possibly multi-plexed with MAC Layer packets of other AT's) with a destination IP address equal to an IP address of its primary RNC. The IP packet is carried over the backhaul network (represented by line 66) to an aggregation router 64 at the data center and the router forwards the packet to the primary RNC over the Ethernet LAN 62.

Access channel packets include an address field that identifies the sending AT. When the sending AT has already been assigned a UATI by an RNC, the address field contains that UATI. When the sending AT does not yet have a UATI, the address field contains a Random Access Terminal Identifier (RATI), which is randomly selected by the AT. The first two bits of the address field indicate whether the address is a UATI or a RATI.

When the I/O subsystem, e.g., an Ethernet I/O subsystem, of an RNC receives a UATI_Request message from an AT with an address field that contains a RATI or an unrecognized UATI, the RNC assumes the role of the serving RNC to handle the session. If the RNC is implemented on a chassis-based hardware platform, it assigns the session to one of its server cards. The AT is then assigned a UATI within some predetermined range. This range, which identifies the serving RNC to all other RNCs in the cluster, is known by the RNCs in the cluster, but not the AT. If the RNC is implemented on a chassis-based hardware platform, the range of the UATI's that belong to a certain RNC may further be subdivided to identify the server card within the serving RNC that is handling the session. The serving RNC also establishes an A10 connection with the PDSN to facilitate the data transfer between the AT and the PDSN. The A10 connection terminates on the server card handling the session.

While dormant, the AT sends RouteUpdate messages, as needed, to provide information about its current location. This mobility information is maintained at a Mobility Manager application in the serving RNC. Since a subnet covers the entire footprint of the RNC cluster, when the AT crosses the boundary between two RNC's in the same cluster, the AT does not detect a subnet change and therefore does not initiate a dormant handoff. But when the AT sends an access channel message to an RN that is associated with an RNC (broker RNC) that is different from the serving RNC, the packet(s) carrying the message are sent by the RN to the broker RNC. The I/O subsystem in the broker RNC examines the address field of all arriving access channel packets and reads the UATI. From the UATI, the I/O subsystem determines by a look-up table the identity of the serving RNC and forwards the packet to the serving RNC over the high-speed LAN.

When the UATI in the access channel packet is received by the serving RNC, it processes the packet locally. As mentioned above, if the serving RNC is implemented on a chassis-based hardware platform, its I/O subsystem first determines the server card that is handling the session and forwards the packet to that card using an internal bus of the serving RNC.

Page Routing

If packet data destined for a dormant AT is received at a PDSN, the packets are forwarded over the A10 interface to a specific server card on the serving RNC. The server card looks up the location information for the AT to which the packet is destined. The serving RNC then sends a paging message via a set of RNs that are determined based on the last Route Update message received from the AT. The paging message is sent via the control channel of one or more sectors associated with the RNC cluster. Note that the RN's transmitting the paging message need not be associated with the serving RNC, but is associated with one of the other RNCs in the cluster.

Connection (Traffic Channel) Establishment

When a serving RNC receives a ConnectionRequest message from the AT, either directly or via a broker RNC, it examines the pilot signal strengths reported by the AT in the RouteUpdate message accompanying the ConnectionRequest message.

In some implementations, each RN's radio resources are managed by a Radio Resource Control function in the RNC with which the RN is associated, and an RN exchanges signaling only with the RNC with which it is associated. Therefore, when a serving RNC wants to establish a traffic channel that involves an RN that is not associated with it, the serving RNC communicates using the LAN 62 (shown in FIG. 3) directly with the Radio Resource Control function in the RN's primary RNC to check for resource availability. (The serving RNC may use a look-up table to determine the RN's primary RNC.) When sufficient radio resources are available, the serving RNC establishes the necessary traffic channel communication links with the RN via the RN's primary RNC and sends a TrafficChannelAssignment message to the AT to initiate the traffic channel set up. Once a traffic channel is established, packets flow directly between the RNs and the serving RNC without any involvement of a broker RNC. Such direct routing reduces the delays typically found in soft handoff procedures that involve triangular routing through another RNC.

When a new traffic channel involves an RN that is outside the footprint of the RNC cluster (different subnet), a similar procedure is implemented. In this case, the serving RNC communicates with the RNC's outside the cluster over an IP network such as a metropolitan-area network to obtain radio resources. If the radio resources are available, the serving RNC establishes a communication link with that RN by exchanging signaling via the RNC with which the RN is associated.

Thus, a serving RNC can maintain a traffic channel even when an AT moves into the coverage area of an RN that is associated with another RNC.

IP-based Radio Network Architecture Without Inter-RNC Signaling

In some implementations, the routing function of access channel packets to the primary RNC is performed by the RNs, which avoids the need to route access channel packets via a broker RNC. For example, when an AT is powered on for the first time, an AT registers with an IS-856 network by acquiring an IS-856 pilot signal broadcast by one of the nearby sectors and synchronizes with the system. The AT then sends a UATI_Request to establish a session with the network. As mentioned before, the AT uses a Random ATI (RATI) in the MAC Layer header to send this request.

When the UATI_Request is received by an RN, it examines the address field of the access channel packet and recognizes that the originator of the message does not have an assigned UATI. The RN then forwards the packet to its primary RNC. To examine the address field, the RN first extracts the MAC Layer capsule fragments from the to received MAC Layer packets, and forms the MAC Layer capsule. The RN then reads the address field in the MAC Layer header.

When the primary RNC receives the UATI_Request, it assumes the role of the serving RNC and assigns a UATI to the AT. The primary RNC then proceeds with the rest of session establishment, in particular the security key exchange and the protocol configurations. The primary RNC also implements the point-to-point protocol (PPP)/challenge handshake authentication protocol (CHAP) procedures to authenticate the AT based on its Network Access Identifier (NAI). There is a one-to-one mapping between the NAI and the terminal's actual International Mobile Subscriber Identity (IMSI). This mapping is maintained in an Authentication, Authorization and Accounting (AAA) server (e.g., a Remote Authentication Dial-In User Service (RADIUS) server). The AAA server passes the AT's IMSI value to the serving RNC.

The packet control function (PCF) function in the serving RNC uses the IMSI value to select a PDSN and establishes an A10 connection to that PDSN. In the A11 Registration message, the PCF function provides the IMSI value of the AT to the PDSN. The AT and the PDSN then set up a PPP link, perform Simple IP or Mobile IP set-up and execute user-level authentication.

Each RN maintains a routing table that maps each UATI to its serving RNC. This routing table may be provided to the RN by a network management system. Each RNC owns the UATI values that fall within a certain range, and when an RN receives an access channel packet, the RN determines from the UATI value in the MAC Layer Header the identity of the serving RNC, and routes the packet to that RNC by placing an IP address of the serving RNC in the destination address field of the IP header. Thus access channel packets are delivered by any RN directly to the serving RNC. The range of UATI values that each RNC owns can be communicated by the RNC to the RN's directly, thereby eliminating the need for explicitly configuring the RN's from the management system with UATI ranges.

The above method requires that the RN maintains a table for mapping the UATI to the IP address of the RNC. Alternatively, the UATI space can be divided among all the RNC's, and each RNC be assigned a unique subspace, and an algorithmic relationship can be established between the IP address of the RNC and the UATI subspace. The RN can then determine the IP address of the RNC from the AT's UATI algorithmically, without using any tables.

It is also possible to have hybrid schemes where access channel packet routing is handled in both a central element and also in a distributed fashion in the RN's. Here, a central UATI server, possibly located in one the RNC's, may be responsible for assigning UATI's and the associated new sessions to serving RNC's. When first establishing a new session, an RNC can request a new UATI from the central UATI server. The serving RNC can also register with a centralized AC router who establishes a binding between the UATI and the serving RNC. When an RN is serving an AT for the first time, it can forward the packet to the UATI router, who can then forward the packet to the UATI router. The serving RNC can then perform a binding update with the serving RN, so that in all subsequent transactions access channel packets can be sent directly to the serving RNC, avoiding triangular routing.

Mobility management for a given AT is handled entirely by the serving RNC. The AT is configured to provide distance-based location update in dormant mode. Thus, when the serving sector becomes more than a certain distance away from the sector where it last sent a RouteUpdate message, the AT sends a new RouteUpdate message to the serving sector over the access channel. The RouteUpdate message is forwarded by the RN to the serving RNC which keeps track of the location of the AT.

When the serving RNC wants to page an AT, the serving RNC determines the RN or RN's from which it wants to send the page, depending on the time and position indicated in the most recent RouteUpdate message received from the AT. (It is assumed that the serving RNC knows the IP addresses of all the RN's in the radio access network.) The serving RNC sends the paging message to the appropriate set of RN's directly. These RN's then page the AT over their respective control channels.

All sectors in an IS-856 network broadcast in their overhead channel their SectorID and Subnet Mask. For a relatively small network, the Subnet Mask can be set to zero, thereby implying that the entire network is one big subnet. In this scenario, the AT never detects a subnet change. Therefore, the AT remains attached to the original serving RNC and does not trigger a dormant inter-RNC handoff. The A10 connection to the PDSN also remains fixed regardless of the position of the AT.

If the radio access network covers a geographically large area, it may be prudent to force a dormant inter-RNC handoff, when the AT moves too far away from the serving RNC and can be served by another RNC that is geographically closer. This can be triggered by the serving RNC, for example, upon receiving a RouteUpdate message from the AT. Alternatively, the Subnet Mask can be chosen greater than zero to introduce a subnet boundary between too far-away RNC's. Then, when the AT crosses the subnet boundary, a dormant handoff occurs and the A10 connection is relocated. Further, the AT is assigned a new UATI and session parameters are transferred from the old serving RNC to the new serving RNC.

Some implementations allow each RNC's to directly exchange signaling with every RN's in the radio access network which helps to reduce set-up time for traffic channels from a configuration in which multiple RNCs are involved in the set up of a traffic channel.

When an AT sends a ConnectionRequest message together with a RouteUpdate message over an access channel to initiate a new traffic channel, the messages are immediately forwarded from the receiving RN to the serving RNC using the UATI-based routing method described earlier.

The serving RNC examines the RouteUpdate message to determine a likely set of sectors for servicing the AT. The serving RNC then corresponds directly with the RNs residing in the servicing sectors to request traffic channel and backhaul resources. The RNs are configured to either decline or accept the RNC's request for resources. If the RN accepts the request, it allocates the necessary radio resources. If resources are available from a sufficient set of RNs in the servicing sectors, the serving RNC accepts the traffic channel request and sends a TrafficChannel assignment message over the Control Channel to the AT. The AT then starts transmitting on the Reverse Traffic Channel (RTC).

Once an RN acquires the RTC, it sends a RTCAck message to the AT which indicates the acquisition of the RTC signal. The AT responds with a TrafficChannelComplete message to indicate the completion of the traffic channel set-up.

In this configuration, each RN controls its own radio resources, both with respect to hardware resources available on the RN, as well as the management of interference across its sectors. As a result, the admission control function is split between the RN and the serving RNC. RNs provide local admission control for the sectors they control while the serving RNC provides a global admission control. Similarly, when a sector in a given traffic channel is inactive for some period of time, the sector can initiate the procedure for closing the traffic channel by sending a request to the serving RNC to close the traffic channel. The serving RNC then makes a global decision on whether to remove that sector from the traffic channel, close the entire traffic channel, or do nothing.

Once a traffic channel has been setup between the AT and a serving RNC, it remains anchored to the serving RNC, even when the AT moves into the coverage area of other RN radio access network.

Packet Routing Between RN and RNC—In More Detail

When a sector in the RN receives a MAC Layer packet on a reverse traffic channel, the sector forwards the packet to an I/O card after adding a Stream Identifier that includes a Connection Identifier. The I/O card uses the Connection Identifier value to look up the IP address of the serving RNC. The I/O card then encapsulates the MAC Layer packet together with its Stream Identifier in an IP packet whose destination address is set to the IP Address of the serving RNC. If the serving RNC is implemented on a chassis-based hardware platform, the I/O module in the serving RNC, upon receiving the packet, reads the Connection Identifier value to determine which of its server cards should handle the packet. The RNC's I/O card then passes the packet along with the Stream Identifier to that server card for processing.

When a sector in the RN receives a MAC Layer packet on the access channel, the sector first reads the UATI in the ATI field of the MAC Layer Header and then forwards the packet to an I/O card associated with the RN after adding a Stream Identifier that includes the UATI of the sending AT along with the serving sector's SectorID. The I/O card in the RN again uses the UATI value to look up the IP address of the serving RNC. The I/O card encapsulates the MAC Layer packet together with its Stream Identifier in an IP packet whose destination address is set to the IP Address of the serving RNC. If the RNC is implemented on a chassis-based hardware platform, the I/O module in the serving RNC, upon receiving the packet, reads the UATI value to determine the server card that serves this session. The I/O card then passes the MAC Layer packet along with the Stream Identifier to that server card for processing.

When the serving RNC has a MAC Layer packet ready for transmission on a forward traffic channel, it encapsulates the MAC Layer packet together with a Stream Identifier in an IP packet whose destination address is set to the IP Address of the RN, which has the serving sector. The serving sector is determined based on sector identifier information provided by the AT. The RN, upon receiving the packet, reads the SectorID value in the Stream Identifier to determine the sector that will transmit the packet. The RN then passes the MAC Layer packet along with the Stream Identifier to the appropriate modem card, which schedules the MAC Layer packet for transmission on the Forward Link using the MAC Index as the preamble.

Similarly, when a serving RNC has a MAC Layer packet ready for transmission on the Control Channel of a particular sector, the serving RNC determines the IP address of the RN to which to send the packet. It then encapsulates the MAC Layer packet together with its Stream Identifier in an IP packet whose destination address is set to the IP Address of the RN. The RN, upon receiving the packet, reads the SectorID value in the Stream Identifier to determine the sector that will transmit the packet. The RN then passes the MAC Layer packet along with the SectorID and MAC Index to the appropriate modem card. The modem card schedules the packet for transmission on the control channel.

Failure Recovery & Load Balancing

Consider an approach where each RN, upon power-up, first communicates with a primary RNC Resource Control Agent that may reside in one or more of the RNC's or on a separate compute engine or server. The primary Resource Control Agent assigns each RN to a primary RNC. The RN then routes all new session requests to that primary RNC.

If an RNC becomes unreachable due to some failure, each AT being served by the failed RNC will eventually recognize that its IS-856 session has been lost, and, will initiate a new session by sending a UATI_Request over the access channel. When an RN receives one of these requests, it routes it to its primary RNC. If the RN cannot reach its primary RNC, the RN can be configured to request a new primary RNC from the primary RNC Resource Control Agent. If the primary RNC Resource Control Agent is also not reachable, the RN will send a request to a secondary RNC Resource Control Agent.

Once the UATI_Request is received by a primary RNC, the primary RNC will immediately establish a new IS-856 session with the AT and will further initiate the procedure to set up a new A10 connection with a PDSN.

Assignment of a new primary RNC may also be initiated by the RNC Resource Control Agent. For example, the RNC Resource Control Agent may continuously or periodically monitor the health of RNC's in the subnetwork, and, upon detection of a failure of an RNC, the RNC Resource Control Agent immediately assigns the affected RNs to new primary RNCs.

In assigning RN's to Primary RNC's, the RNC Resource Control Agent may perform load balancing to ensure that user sessions are evenly distributed across all available RNCs. For example, when a primary RNC or an RN receives a new UATI_Request, the primary RNC (or the RN) asks the RNC Resource Control Agent to assign the session to an RNC. The RNC Resource Control Agent assigns the session to an RNC based on resource availability, loading and the distance between the RNC and the RN presently serving the AT. This approach provides a mechanism for load balancing among RNC's, allowing user sessions to be dynamically distributed across RNCs, while also taking into account the current position of the AT. In case of an RNC failure, all new session requests will arrive at the RNC Resource Control Agent, which will then assign the sessions to new RNCs, again based on loading and other considerations.

The RNC Resource Control Agent may also be used to trigger dormant handoffs for load balancing or other purposes. In Phase 1 IS-856 networks, a dormant inter-RNC handoff is always triggered by the AT upon detection of a subnet change. As described above, lack of an immediate dormant handoff may result in lost paging data.

Figure 4:
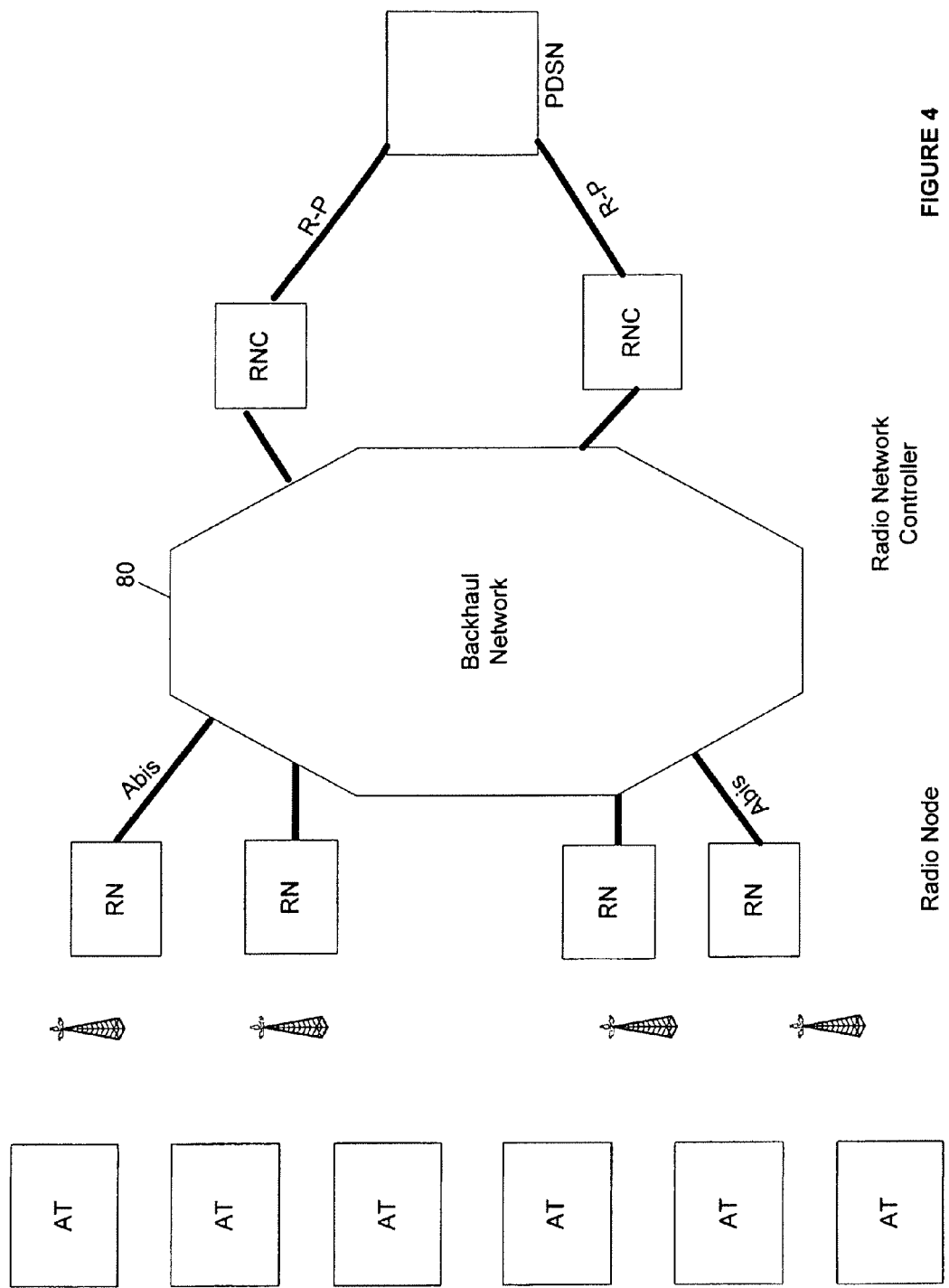

In an IS-856 networks shown in FIGS. 3 and 4, for example, a dormant handoff can be initiated by the network based on the location of the AT. Upon receipt of a RouteUpdate, when a serving RNC determines that a transfer of a user session to another RNC is desired (for load balancing or other reasons), the serving RNC sends a Dormant Handoff request to the RNC Resource Control Agent which assigns the session to a new RNC. The new serving RNC then assigns a new UATI and performs a session transfer from the previous serving RNC.

In a more distributed implementation of the RNC Resource Control Agent concept, RNCs can communicate with the RNs and other RNCs to provide routing information (including their loading) to all the RNs, thereby allowing the RNs to route incoming session requests to the correct RNC without going through a RNC Resource Control Agent. For example, each RN may have a preferred RNC list and whenever it needs to assign a new session to an RNC, it selects one of the RNCs in this list according to some algorithm (pseudo-random selection, round-robin, etc.) If an RNC in the preferred list were to become unavailable, the RN would detect this (KeepAlive messaging can be used between RNs and RNCs to help the RN detect an RNC failure), and remove that RNC from its preferred list. A drawback of this approach is that some backhaul signaling traffic would be created as a result of exchanging such dynamic loading information.

Failure Recovery with Session Preservation

In some networks, it may be useful to recover user session information in case of an RNC failure, for example, to reduce air link congestion caused by new session requests after an RNC failure. To preserve sessions in case of failure of an RNC, a copy of such information (for all sessions in the subnetwork) can be stored in the RNC Resource Control Agent.

When an RNC fails and the AT initiates a new session, its new session request will reach the RNC Resource Control Agent. The RNC Resource Control Agent then assigns a new serving RNC to each session, a and provides the session information to the new serving RNC to avoid potentially lengthy session establishment procedures. Once a new UATI is successfully assigned to the AT, communication with the network may resume. The RNC Resource Control Agent further provides information related to the A10 interface to allow the RNC establish an A10 session with the same PDSN, thereby avoiding the creation of new PPP and Mobile/Simple IP sessions.

In a chassis-based RNC, the RNC Resource Control Agent may run on a specific redundant card, with a hot standby. The RNC Resource Control Agent is then responsible for storing session information. In case a server module fails, the session is internally reallocated to another server module. In principle, the operation of this system is the same as the one operating across the network. Moreover, in this case, it is not necessary to reestablish the A10 session to the PDSN, since the external IP address of the PCF seen by the PDSN can be maintained.

Integrated RNC & PDSN

Another benefit of an IP-based radio access network architecture such as the examples described above is the ability to combine the RNC and PDSN functions in a single network element. In hierarchical 3G packet data networks, a PDSN represents the highest point in the hierarchy, and therefore can support multiple RNC's. A new generation of PDSN's are expected to supports hundreds of thousands of users, and several RNC's.

In radio access networks with dedicated point-to-point links between RNs and RNCs, integrating the PDSN function within the RNC would be undesirable, because this would reduce the number of sessions that could be supported, resulting in frequent costly handoffs between PDSN's that involve new PPP and Simple/Mobile IP registrations.

In the IP-based radio access network architecture such as the examples described above, handoffs between RNCs occur much less frequently, and therefore make integration of the PDSN function into the RNC more advantageous. Since an active call can always be served by the same RNC, inter-PDSN handoffs are normally not required during an active call. Such an approach also simplifies the networking between the RNC and the PDSN, and further increases scalability and reliability.

In an RNC with an integrated PDSN, the PDSN functionality includes PPP termination, Simple IP and/or Mobile IP foreign agent and the AAA client functions. As long as the AT remains within a subnet (say an RNC cluster), no inter-PDSN handoffs would be required.

If an integrated RNC/PDSN fails, all sessions supporting an AT (including the air interface, PPP and Simple/MobileIP sessions) are transferred to another RNC/PDSN combination thereby avoiding any new session establishment between the AT and the wireless network.

It is also possible to integrate the RNC/PDSN with the RN. In this case, the RNC/PDSN functionality may be co-located with the RN in the same site, or even in the same enclosure.

It should be understood that the methods described in this disclosure are equally applicable to networks where the RNC and the PDSN or the RN, RNC and the PDSN are integrated or co-located.

IP-based Radio Access Network Architecture with Primary/Secondary RNC Association Each RN has a primary (e.g., default) RNC with which the RN associates (e.g., establishes a primary association), as described above. Using the backhaul network, such as backhaul network 80 shown in FIG. 4, each RN may also associate with one or more additional RNCs in the IP RAN. These additional RNCs may be referred to as secondary RNC's for that RN. To associate with an RNC, the RN provides sufficient information about itself to a secondary RNC to allow the RNC to communicate with ATs via that RN. Further, to support signaling exchanges between the RN and a secondary RNC, signaling connections are established between them. The RNC also distinguishes between primary RNs and secondary RNs. Establishment of secondary associations can be performed, for example, when an RN powers up.

When an RN receives an access channel packet from an AT, the RN forwards the packet blindly to its primary RNC. A dormant AT in the coverage area of an RN is served by the primary RNC of that RN. In a basic implementation, all RNs that share the same primary RNC belong to the same subnet. When the AT crosses a subnet boundary, the AT sends a UATI-Request to its serving RN, who then forwards the request to its primary RNC. Since this UATI is not served by that RNC, that RNC initiates the normal procedures for dormant inter-RNC handoff with the old serving RNC according to the A13 interface defined in 1xEV-DO IOS. The new RNC also performs an A10 handoff. It is also possible to allow RNs belonging to different subnets to share the same primary RNC. In this case, when the AT sends a UATI-Request upon crossing a subnet boundary, the message gets forwarded to the same primary RNC that is currently serving the AT (because the same RNC is the primary RNC for RN's in both subnets). The primary RNC, recognizing that it is already serving this UATI, can then proceed with a UATI assignment without an A13 procedure or an A10 handoff.

When the primary RNC receives an incoming data over an A10 connection for a dormant AT, the primary RNC proceeds with the paging procedure as usual. The paging message is sent via all RNs that have this RNC as the primary RNC, or a subset thereof.

When a serving RNC receives a traffic channel request message from an AT requesting the set up of a traffic channel, the serving RNC first examines the Route Update message to determine the sectors that are needed and finds the RNs where these sectors are located. The serving RNC then contacts these RNs to set up the traffic channel as usual. The primary/secondary association allows the RNC to map the PN offsets of the requested pilots to RN's IP addresses and use the pre-established signaling connection with these RN's to set up all handoff legs. Once an active traffic channel is established, the serving RNC remains anchored as the RNC for that traffic channel. The serving RNC adds and removes RNs as the AT moves through coverage areas using the secondary associations of the RNs.

For example, as an AT first communicates with a first RN, that RN, as described above, forwards a request to its primary RNC (i.e., the RNC with which the first RN has a primary association). Once a traffic channel is established, the primary RNC remains the serving RNC for that entire traffic channel as the AT travels from the coverage area of the first RN to the coverage area of a second RN, even though that second RN does not have a primary association with the serving RNC. This allows the user activity (e.g., phone call, data transfer) to continue uninterrupted. While the AT is moving from the coverage area of the first RN to the coverage area of the second RN, the AT communicates the pilot strength information for the second RN to the serving RNC by sending a RouteUpdate message. As in normal soft handoff between RN's that have the same primary RNC, this communication occurs while the AT is still using the first RN. Upon reception of the RouteUpdate message, the serving RNC can communicate with the second RN because of the established secondary association, which, as described above, includes information such as the PN offset of the pilot signal and the IP address of the RN, to allow the serving RNC to contact the second RN and establish a communication channel.

Since RNs always forward their access channel packets to their primary RNC, there is no need for the RN to perform access channel packet routing based on UATI. This simplifies the implementation of the IP-based radio access network.

Chassis-Based Systems

The concepts described above can also be used in chassis-based systems by, for example, treating each server card as an IP addressable RNC or each modem card as an IP addressable RN. The logical operation of the system is unchanged.

However, in large networks with many server cards, treating each server card as an independent RNC may result in a large number RNCs, which in turn can create many signaling connections and RN-to-RNC associations. One way to simplify this complexity is to treat the entire chassis as an IP addressable RNC and handle intra-chassis communication using internal protocols. Again the concepts described above can be used in the same fashion, and the logical operation of the RNC and RN are unchanged when viewed from the outside. The following description describes in more detail how these concepts impact the internal operation of a chassis-based RNC.

In some of the examples above, when an RN associates with its primary RNC, a signaling connection is established between the RN and RNC. In a chassis-based RNC, one of the server cards may assume the responsibility for performing the association and terminating the signaling connection. This means, when a new RN wants to associate with an RNC, the RN is internally assigned (homed on) to one of the server cards. Subsequently, all signaling between the RNC and the RN is performed via that server card. In an IP-based radio access network with inter-RNC signaling, a chassis-based RNC can discover other RNC's, including the pseudo-random noise (PN) offsets these RNC's serve and the UATI space they control, using an inter-RNC topology manager, which may reside for example in a system controller (SC) card. In this configuration, a system controller card would communicate with the RNC server cards to learn the necessary information about the RN's served by the server cards, and then pass the information to other RNC's.

In some implementations in which a chassis-based RNC is utilized, when an RN forwards a received access channel packet to the RNC, the packet is first intercepted by an I/O card on the RNC. The I/O card inspects the UATI address in the access channel packet, determines the server card serving that UATI, and forwards the packet to either the server card on the RNC, or, if the packet has a UATI address served by a different RNC, then to the appropriate RNC. To perform such forwarding, the I/O card maintains tables that map UATI addresses to RNC's and further maps local UATI addresses to server cards.

When a server card in a chassis-based RNC receives a request for a traffic channel set up from an AT, the server card determines from the RouteUpdate message a set of RN's whose pilots are needed for the active set by mapping the received PN offsets to RN IP addresses. The server card then exchanges signaling directly with those RN's that are homed on that server card to establish the needed traffic channel legs. For other RN's that are homed on the same RNC chassis, if there are any, the server card first determines the server cards where those RN's are homed. The server card contacts these server cards sharing the same chassis, which in turn contact the RN's to establish a traffic channel leg. For other RN's that are homed on other RNC chassis, the server card contacts these RNC's. The I/O card in these RNC's then routes the request to the server cards where the RN's are homed on. These server cards then contact the RN's to establish the needed traffic channel legs.

Since direct IP communication is possible between all RN's and RNC's in the IP RAN, all traffic channel legs operate directly between the RN's and the serving RNC. When the I/O card of a chassis-based RNC receives a traffic channel packet, the I/O card forwards the packet to the server card where the traffic channel is being handled based on a unique connection identifier.

In some implementations, each server card can be assigned an IP address and it can supply this address to the RN's that are serving the traffic channel. The RN's can then send traffic channel packets directly to the serving RNC. The packets are then routed via the I/O card to the server card without requiring a higher-layer look-up based on a connection identifier.

A chassis-based RNC can maintain communication with an AT, even when the AT is in the coverage area of an RN for which it is not the primary RNC. All user traffic flows directly between the RN's and the serving RNC. When a dormant AT travels across the entire IP RAN, an inter-RNC handoff is not required (although possible), since the serving RNC can page an AT via any RN in the IP RAN.

In an IP-based radio access network with inter-RNC signaling, there can be discovery and communication between the RNC's via a system controller card, such as the one described above. However, a network using a system controller card to perform inter-RNC signaling can result in triangular routing of access channel packets when, for example the primary RNC is not the serving RNC. Moreover, failure of an RNC server card results in the failure of all RN's who are homed on it and if an entire RNC chassis fails, all primary RN's are lost. Therefore, in some implementations an IP-based radio access network associates each RN with multiple RNCs. A table is maintained in the network which maps UATI addresses to the serving RNC. In this approach, RNs may be configured with subnet information, or it may be provided by a primary RNC. The RN also maintains a signaling connection with multiple RNC's in the IF RAN. In a chassis-based RNC, signaling terminates at one of the server cards on the RNC, which is assigned to home that RN. The RN provides information about itself, including its IP address, to the server card where it is homed. This server card in turn distributes the information to other server cards in the chassis-based RNC.

When an RN receives an access channel packet from an AT, the RN inspects the UATI address field, determines the IF address of the serving RNC from a routing table or algorithmically, and forwards the packet to that RNC. An I/O card in the RNC intercepts the packet, identifies the packet as an access channel packet, inspects the UATI address, and routes the packet to the server card handling this AT. Each RNC is assigned a set of UATI's, and this set is communicated to the RN's either via configuration or dynamically during operation.

In traffic channel set up on an RN served by a server card, the server card directly contacts the RNs which are homed on the server card to request the set up of a traffic channel leg. For traffic channel set up on other RNs, the server card first determines the other server card where the RN is homed, and contacts that other server card, which contacts the RN to set up the traffic channel leg. The RNCs can behave as autonomous entities with minimal inter-RNC communication.

In configurations where each RN is homed on one server card in the RNC chassis, failure of a server card results in the failure of all the RN's that are homed on it. These RN's can no longer serve any of the sessions that reside on the RNC, even those that are still alive on server cards other than the failed server card. Such problems do not occur when each server card in the chassis behaves as an IP addressable RNC. In this case, each RN is homed on every server card, and failure of a server card does not impact RN's or session being served by other server cards.

In some implementations, each RN is associated with a primary and one or more secondary RNC's. For example, in a network utilizing chassis-based RNCs, each RN has a primary chassis-based RNC with which the RN associates. In addition, each RN also associates with one or more other chassis-based RNC's in the IP RAN, which are referred to as the RN's secondary RNC's.

The RN provides sufficient information about itself to both its primary and secondary RNC's, which allow these RNCs to communicate with ATs via the RN. Further, to support signaling exchanges between the RN and secondary RNCs, signaling connections are established between the RN and its secondary RNC's. In each case, the association between the RN and the chassis-based RNC is handled via one of the server cards in the RNC chassis.

Access channel packets are forwarded by the RN to its primary RNC are intercepted by the RNC's I/O card, which inspects the UATI field and forwards the packet to the server card currently handling that UATI. A dormant AT in the coverage area of an RN is served by a server card in the primary RNC of that RN. All RN's that share the same primary RNC belong to the same 1xEV-DO subnet. When the AT crosses a subnet boundary, the AT sends a UATI-Request to its serving RN, which then forwards the request to its primary RNC. Since this UATI is not served by that RNC, the I/O card after inspecting the UATI field, forwards the request to any one of its server cards. A server card can then initiate the normal procedures for dormant inter-RNC handoff with the old serving RNC according to the A13 interface defined in 1xEV-DO protocol. The new server card also performs an A10 handoff.

It is also possible to allow RN's that belong to different 1xEV-DO subnets to share the same primary RNC. In this case, when the AT sends a UATI-Request upon crossing a subnet boundary, the message gets forwarded to the same primary RNC that is currently serving the AT (because the same RNC is the primary RNC for RN's in different subnets). By inspecting the UATI address, the I/O card in the primary RNC can forward the packet to the server card that is currently serving that UATI, and that server card can then proceed with a UATI assignment without an A13 procedure or an A10 handoff.

When the primary RNC receives incoming data over an A10 connection for a dormant AT, the packet is again intercepted by the I/O card, which, after inspection forwards the packet to the server card handling that A10 link. The server card then proceeds with the paging procedure as usual. The paging message is again sent via all RN's that have this RNC as the primary RNC, or a subset thereof.

When a server card receives a traffic channel request message from an AT requesting the set up of a traffic channel, the server card examines the Route Update message to determine the pilots that are needed and finds the other server cards that are currently handling these pilots. The server card contacts these other server cards, which in turn contact the RNs to set up the traffic channel as usual. The primary/secondary association allows the server card to map the PN offsets of the requested pilots to identifiers for the server cards where the RN's are homed and use the pre-established signaling connection through these homed RN's to set up all handoff legs.

The description above can be further extended to increase reliability in case of a server card failure. In some examples, when a server card fails, all user sessions served by that card are also lost. This means the user may remain unreachable for a considerable amount of time. The user may also be unaware that he/she is unreachable. To prevent this, when a user session is first established a copy of the session state information is stored on a separate card, for example, the system controller card. Session information includes various protocol configurations, mobility information, UATI, etc. When the session parameters change, the session information on the system controller card is updated. As mentioned earlier, session information may also be stored on a database, internal or external to the RNC chassis.

The system controller card uses a heartbeat signaling mechanism to detect the failure of a server card and assigns the session to any one of the remaining server cards. To select a new server card, the system controller card may keep track of session load on individual server cards and allocate the failed sessions to new server cards based on their load. The new server card may reassign the UATI to ensure that the new server card has connectivity with the AT. In this method, using just one extra server card in a load-balanced N+1 redundancy configuration will ensure that there is enough headroom to reassign the sessions on the failed server card.

Even though some of the techniques described above employ the 1xEV-DO air interface standard, the techniques are equally applicable to other CDMA and non-CDMA air interface technologies. In this case, the link layer address (ATI) could be something different from ATI used in 1xEV-DO (e.g., TMSI in cdma2000), and other RN zones, such as paging zones, PCF zones, etc, could be used instead of 1xEV-DO subnets.

Connection-Level Load Balancing and Overload Control in Chassis-Based RNC

In a chassis-based RNC, if loading on a server card exceeds processing and memory capabilities of the card, the performance of all users being served by the card may be affected. To prevent such overload conditions, connection-level load balancing may be used.

For example, when processing and memory usage becomes too large, the server card may trigger an active session transfer for one or more connections to one or more other cards where resources may be available. In such load balancing or overload control schemes, it is desirable to have some central entity in the chassis, e.g., a system controller card, to keep track of the individual loading of each server card on the chassis.

In some implementations, when a server card becomes overloaded, server card determines which connection to transfer to another card. Here the server card may use one of several criteria, including the QoS needs of individual flows in the connection, how much processing and memory resources the connection has recently been using, the QoS-class of the user, etc. Once the server card determines which connection(s) it wants to transfer to another server card, it contacts a central load tracker associated with the RNC and requests target server card(s) where these connections can be transferred.

When the central load tracker provides a list of available server cards, the overloaded card directly contacts one or more of the available server cards to initiate an active session transfer (or handoff), similar to active inter-RNC handoff procedures discussed below.

In some implementations, the central load tracker triggers the load balancing proactively. For example, when a central load tracker detects that the RNC's server cards are unevenly loaded, the central load tracking entity sends an active session transfer request to an overloaded server card along with the identity of a less-loaded server card that can serve the connection.

In some implementations, load balancing is performed across multiple RNC's in a cluster in an IP-based radio network. For example, a load tracking entity central to all RNC's in a cluster keeps tracks of the overall load of individual RNC's, by interacting with the local load trackers in each RNCs. If the central load tracking entity detects an load imbalance among the clustered RNCs, it triggers active session transfer from an overloaded RNC to a less-loaded RNC. A central tracking entity for a cluster may reside in one of the RNC's in the cluster or may be external to the RNCs in the cluster.

Load balancing and overload control mechanisms described above can be implemented in a distributed manner inside an RNC and/or inside the cluster. For example, instead of a central load tracking entity associated with a cluster, local load tracking entities in the RNCs within the cluster can share loading information directly with each other. This way, when an RNC is experiencing overload, it can determine which RNC in the cluster to transfer an active session by, for example, contacting other local load tracking entities to determine availability of other RNC's in the cluster. It can then trigger an active handoff to an available RNC. A similar strategy could be used to handle load balancing within an RNC.

When a server card fails, all connections being handled by that server card are also lost, unless there is some mechanism to save critical connection state information elsewhere in the RNC or externally in the cluster. In some implementations, connection state information may be served on a system controller card of the RNC. Thus, when a server card fails, the system controller can allocate the traffic channels on the failed server card to other server cards in the system. A server that assumes the responsibility for a server card, would then establish the traffic channel legs to all sectors serving the connection, restore the A10 link to the PDSN, and initialize the radio link protocol, and resume traffic channel operation.

Dormant Handoffs in Partially-Connected Radio Networks

In an IP-based radio network, a dormant AT may connect to the network via a plurality of RNCs regardless of the RN that is currently serving it. These RNC's together with the RNs they serve form a cluster. When every RN has full association with every RNC, such a cluster is referred to as a mesh RNC cluster. Inside a mesh RNC cluster, a dormant AT can always maintain connectivity to its serving RNC, since the serving RNC can communicate with the AT via any one of the RNs in the cluster. This means that the serving RNC can page the AT anywhere inside the cluster and the dormant AT can send an access channel message to the serving RNC anywhere inside the cluster.

When an RNs does not have an association with each RNC in a cluster, the cluster is referred to as a partially-connected cluster. In a partially-connected cluster, an AT may lose network connectivity if the RN currently serving it does not have an association with its serving RNC. This means the AT may become unreachable or it may not be able to send access channel messages to its serving RNC, for example to request a new connection. To prevent this from happening, the AT's session is moved from the serving RNC to another RNC where the AT can maintain connectivity.

In some implementations, RNCs and RNs in a cluster are subdivided into multiple mesh clusters and 1xEV-DO subnet boundaries are created between RN's that belong to different clusters. Then, whenever a dormant AT crosses the subnet boundary between clusters, it sends a UATIRequest, triggering a so-called A13 inter-RNC dormant handoff. The RN who receives the UATIRequest would forward it to its primary RNC (or one of the RNC's in its cluster), and this RNC will then determine, from the UATI, the RNC currently serving the AT's session and would trigger the A13 dormant handoff. Creating subnets between clusters would thus ensure that a dormant AT always remains connected to the network.

When an active AT crosses the subnet boundary between clusters, the connection can still be maintained as long as the serving RNC has the necessary association to assign traffic channels to RN's in other clusters. Otherwise, an active RNC handoff has to be performed before reaching the boundary of connectivity.

In some implementations, a partially-connected cluster is configured to allow an AT to move to the coverage area of an RN which does not have an association with the AT's serving RNC, and the serving RNC may not be aware that the AT is no longer reachable. For example, the current paging area of the AT, as determined by the RouteUpdateRadius of the sector where the AT last sent a RouteUpdate, may include an RN that does not have an association with the serving RNC. Therefore, when the RNC receives paging data for this AT, it cannot directly page the AT via these RNs. To address this issue, the RNC maintains a paging area list for every RN with which it maintains an association. The paging area list is determined by the RouteUpdateRadius of the RN. This list not only includes the IP address of all the RN's in the paging area with whom the RNC has an association, but also includes the IP address of the primary RNC for RNs with which it has no association. When the serving RNC receives paging data, it sends a Page message directly to RN's with whom it has an association and forwards the Page request for other RN's to their primary RNC, which will in turn page the AT via their RN's in the paging area. The serving RNC, when it forwards a page message to another RNC, includes additional information to allow the other RNC to determine via which of its RN's it needs to send the page message.

In some implementations, the serving RNC sends a page message directly only via those RN's for which it is the primary RNC, and for other RNs, it forwards the page message to their primary RNC, which in turn page the AT via their RN's in the paging area.

In a partially-connected cluster, an AT may send an access channel message to the network when it is within the coverage area of an RN which has no association with the serving RNC. In this case, the serving RN, upon recognizing from the UATI field in the access channel packet that the packet is being served by an RNC with which it has no association, forwards the packet to its primary RNC (or some other RNC it selects based on a load balancing algorithm). The RN's primary RNC, before processing the received access channel message, will trigger an A13 dormant handoff where the AT's session will be transferred from the serving RNC, which will assume the role of the Source RNC during the handoff, to the RN's primary RNC, which will assume the role of the Target RNC during the handoff. The Target RNC derives the IP address of the Source RNC from the UATI in the received access channel packet and then sends an A13 request message to the Source RNC. After receiving the AT's session information from the Source RNC, the Target RNC will assign the AT a new UATI, complete the A13 handoff and then process the received access channel message. For example, if the access channel message was a ConnectionRequest message, the Target RNC will set up the traffic channel legs to the RN's involved and will send a Traffic Channel Assignment message. It is important that the Target RNC complete the A13 handoff procedure in time to send the TCA message before a timer expires in the AT.

The methods described in this section can also be used in distributed IP-based radio networks where the RNC and RN functions are co-located or integrated in the same base station.

Active Handoffs in Partially-Connected Radio Networks

In an IP-based radio access network, an RNC may not have an association with all RNs in the network. Therefore, a serving RNC cannot maintain a traffic channel for an access terminal (AT) indefinitely. If the AT moves into the coverage area of an RN that does not have an association with the serving RNC, it will gradually lose radio connectivity to its serving RNC. Once the connection is lost, the AT will try to re-establish a new connection, initiating the activity-triggered dormant handoff procedure described above. One way to reduce the interruption caused by lack of association is for the serving RNC, upon recognizing that the AT can better be served by sectors with whom it has no connectivity, is to close the connection, so as to prevent a potentially lengthy period before the AT decides to close the connection. Such pro-active action by the serving RNC can avoid the so-called "RF dragging problem".

To prevent the connection drop described above altogether, a handoff can be performed from the serving RNC to another RNC that has association with RN's that are in the vicinity of AT's current location.

As the AT moves from the coverage area of one RN to the coverage area of another RN, it sends a RouteUpdate message to its serving RNC, which the serving RNC uses to perform normal soft handoffs. Through these RouteUpdate messages, the serving RNC obtains a fairly accurate assessment of where the AT is located, and can use this information to trigger the active RNC handoff, as follows.

Each RNC may be configured with a table that shows the primary RNC of each homed RN. When the RNC decides to trigger an active handoff, it can send a HandoffRequest message to the primary RNC of the serving RN to initiate the handoff. Other methods could also be devised in selecting the Target RNC for the active handoff.

Active handoff is more complex to implement than a dormant handoff, since in active handoff also active call state needs to be transferred from the Source RNC to the Target RNC. Also, when a Radio Link Protocol (RLP) is in use, it becomes important to move the RLP handling from the Source RNC to the Target RNC with minimal interruption. There are alternative ways of implementing active handoff. For example, one could establish a new RLP link via the new RNC, before dropping the existing RLP link via the old RNC. This allows the AT to continue to receive via the Source RNC, while the handoff is in progress. Once the handoff is completed, the RLP link to the Source RNC could be terminated and all packets could flow via the Target RNC. 3GPP2 is currently standardizing protocols to implement such active handoffs to enable interoperability between different vendor's RNC equipment.

The methods described in this section can also be used in distributed IP-based radio networks where the RNC and RN functions are co-located or integrated in the same base station.

Multi-Carrier Operation in IP-Based Networks

Another advantage of an IP-based radio access network is in high-capacity multi-carrier (multiple frequency channel) deployments. In traditional systems with strict RNC boundaries, adding a new carrier may require splitting the RN's served by the RNC on carrier #1, so that a new set of co-located RN's on carrier #2 can be served by the same RNC. Serving co-located carriers by the same RNC is a critical requirement in traditional systems, in order to ensure that proper multi-carrier load balancing algorithms can be applied. Multi-carrier load balancing is used to distribute the traffic channel load across the available carriers equitably, so as to maximize overall user experience. With load balancing, packet data users' experience is improved, and blocking probability for voice users is minimized. As a result, when a new carrier is added, it is necessary to remove some of the RN's on the first carrier from their serving RNC in order to make room for RN's on the second carrier. This causes unnecessary service disruption.

In an IP-based radio access network, since an RNC can maintain association with a larger set of RN's, it is not necessary to remove any of the existing RN's on the first carrier from their RNC(s). Instead, one can add a $2^{nd}$ RNC and have all existing RN's associate with it, while still maintaining their association with the $1^{st}$ RNC. This avoids any service disruption. As more RN's are added on the $2^{nd}$ carrier, these establish associations with both the $1^{st}$ and $2^{nd}$ RNC.

When an AT requests a new session, the serving RN can forward the session request to any one of the two RNC's based on some inter-RNC load balancing mechanism, or it may forward the session to a default RNC. This RNC will then become the serving RNC for that session, and will serve the AT as long as the AT remains within the footprint of the entire RNC cluster, regardless of which carrier the AT is monitoring. Also, at the time of traffic channel establishment, the serving RNC can assign the AT to a set of RN's that operate on any one of the available carriers. Provided the RN's supply their load information to all RNC's with whom they are associated, such traffic channel assignment can be implemented so as to balance the load across carriers. Since all RN's on all carriers may operate on the same 1xEV-DO subnet, an inter-RNC dormant handoff is not required when the AT changes the carrier it is monitoring.

Alternatively, in IP-based radio access networks with primary/secondary association, the RN's operating on the $1^{st}$ carrier will use RNC #1 as their primary RNC, while RN's operating on the $2^{nd}$ carrier will use RNC #2 as their primary RNC. At the same time, all RN's will have secondary association with the other RNC as well. In this case, when a new session request arrives on the $1^{st}$ carrier, the serving RN forwards it to its primary RNC, who then becomes the serving RNC. Alternatively, when a new session request arrives on the $2^{nd}$ carrier, the serving RN forwards it to its secondary RNC, who becomes the serving RNC. Again either RNC can assign an AT to traffic channels on either one of the carriers, so as to balance the traffic load across the carriers. Again this requires that the RN's supply their load information to all RNC's, both primary and secondary. The only drawback of the IP-based radio access network with primary/secondary association is that if the AT were to change the carrier it is monitoring, an inter-RNC dormant handoff has to be performed. An AT may change the carrier it is monitoring, for example, after being redirected by its serving RNC. Such redirection may occur, for example, to direct an AT to a carrier that is better equipped to serve the AT. In mixed revision networks, where one carrier supports so-called Revision 0 of the 1xEV-DO standard, while a $2^{nd}$ carrier supports the so-called Revision A, the network may redirect Rev A users from the Rev 0 carrier to the Rev A carrier. Such redirection may also occur at carrier boundaries, where the coverage of a carrier may end, or in case of failure of an RN. If an AT loses RF link to a given RN on carrier #1, it may connect to co-located RN's on carrier #2. Again, an inter-RNC dormant handoff is required to perform such an inter-carrier handoff.

The methods described in this section can also be used in distributed IP-based radio networks where the RNC and RN functions are co-located or integrated in the same base station.

Border Cell Paging

In IP-based radio networks, handoff boundaries can be greatly reduced by forming large clusters. However, formation of large clusters may not completely eliminate handoffs. A well-known problem often seen in dormant handoffs is loss of paging data during dormant handoffs. In dormant inter-RNC handoffs, the AT will be monitoring only one sector at a time. As soon as the AT starts monitoring a sector that is not reachable by the serving RNC, the serving RNC can no longer page the AT. AT reaches pageability again after its session has been transferred to a new RNC and the PDSN is now forwarding AT packets to the new RNC. In order to prevent loss of paging data, serving RNC may include in the session information that it sends to the new RNC during A13 dormant handoff any outstanding paging data. The serving RNC, upon completing the A13 dormant handoff, can then page the AT. This will ensure that the AT remains page-able during the dormant inter-RNC paging procedure.

A number of embodiments of the invention have been described. Nevertheless, it will be understood that various modifications may be made without departing from the spirit and scope of the invention, and, accordingly, other embodiments are within the scope of the following claims.

What is claimed is:

1. A method for exchanging digital information using mobile access terminals in a wireless network, the method comprising:
   transmitting packets over a first traffic channel, established between a first mobile access terminal and a first radio network controller, via a first radio node without passing through a second radio network controller;
   transmitting packets over a second traffic channel, established between a second mobile access terminal and the second radio network controller, via a second radio node without passing through the first radio network controller, the second radio network controller being different from the first radio network controller and the second radio node being different from the first radio node;
   while transmitting the packets over the second traffic channel, maintaining the first traffic channel between the first access terminal and the first radio network controller when packets of the first traffic channel are received from or transmitted to the first access terminal via the second radio node; and
   transmitting packets received from the first access terminal to an external network.

2. The method of claim 1 further comprising:
   performing an active handoff of the first traffic channel from the first radio network controller to the second radio network controller upon detecting that the first access terminal is near a third radio node.

3. The method of claim 1 further comprising:
   closing the first traffic channel by the first radio network controller upon detecting that the first access terminal is near a third radio node.

4. The method of claim 1 further comprising:
   establishing a first session for a third mobile access terminal on the first radio network controller via the first radio node;
   keeping track of the approximate location of the third access terminal based on location update messages sent by the access terminal;
   receiving packets at the first radio network controller for the third access terminal while the third access terminal is in a dormant state;
   sending the second radio controller a message requesting that the second radio controller page the third access terminal; and
   paging the access terminal from the second radio network controller via a third radio node.

5. The method of claim 4 further comprising,
   receiving at the third radio node a traffic channel request message from the third mobile access terminal over an access channel;
   forwarding the traffic channel request message from the third radio node to the second radio network controller;
   performing a handoff of the first session from the first radio network controller to the second radio network controller; and
   after completing the handoff, establishing a traffic channel between the second radio network controller and the third access terminal.

6. A method of claim 1, wherein the first radio network controller comprises a plurality of server cards, the method further comprising:
   establishing the first traffic channel between the radio network controller and the first mobile access terminal on one of a server card selected from the plurality of server cards;
   sending an address of the selected server card from the radio network controller to the first radio node;
   sending reverse link traffic channel packets from the first radio node to the address of the selected server card;
   sending the address of the selected server card from the first radio network controller to the second radio node; and
   sending reverse link traffic channel packets from the second radio node to the address of the selected server card.

7. The method of claim 1 wherein the first radio node operates on a first frequency channel and the second radio node is co-located with the first radio node and operates on a second frequency channel.

8. The method of claim 7 further comprising,
   establishing a first session for the first mobile access terminal on the first radio network controller via the first radio node operating on the first frequency channel;
   establishing a second session for the second mobile access terminal on the second radio network controller via the second radio node operating on the second frequency channel; and
   establishing a third session for a third mobile access terminal on the first radio network controller via the second radio node operating on the second frequency channel.

9. The method of claim 7, further comprising:
   establishing a primary association between the first radio node operating on the first frequency channel and the first radio network controller;
   establishing a secondary association between the second radio node operating on the second frequency channel and the first radio network controller;
   establishing a first session for the first mobile access terminal on the first radio network controller via the first radio node operating on the first frequency channel; and
   transferring the first session to the second radio network controller, whenever an access terminal starts monitoring the second radio node in a dormant mode.

10. The method of claim 7 further comprising:
    receiving a connection request from the first mobile access terminal in the first radio network controller via the first radio node operating on the first frequency channel; and
    establishing a third traffic channel for the first access terminal on the first radio network controller, the traffic channel flowing via the second radio node operating on the second frequency channel.

11. The method of claim 10 further comprising:
    establishing the third traffic channel flowing via the second radio node operating on the second frequency channel based on actual load information received by the first radio network controller from the first and second radio node.

12. The method of claim 10 further comprising:
establishing a third traffic channel flowing via the second radio node operating on the second frequency channel based on an estimate of load on the first and second radio nodes.

13. The method of claim 1, wherein the first and second radio network controllers each include a plurality of server cards, the method further comprising:
handling a plurality of traffic channels on a first server card in the first radio network controller;
detecting an overload condition in the first server card;
selecting a traffic channel served on the first server card for transfer to another server card; and
transferring the selected traffic channel to another server card in one of the radio network controllers without dropping the traffic channel.

14. The method of claim 13 wherein selecting the traffic channel for transfer is based at least partially on the amount of processing resources used by the selected traffic channel.

15. The method of claim 13 wherein selecting the traffic channel for transfer is based at least partially on a quality-of-service requirement of the traffic on the plurality of traffic channels.

16. The method of claim 13 further comprising:
determining a target server card to transfer the selected traffic channel to based at least partially on load and availability of other cards in the radio network controllers.

17. The method of claim 13 wherein the first server card and target server card are both located in the same radio network controller.

18. The method of claim 16 wherein information about the load of server cards is provided by a centralized load tracker.

19. The method of claim 18 wherein the centralized load tracker is located in a radio network controller.

20. The method of claim 18 wherein the centralized load tracker is external to all radio network controllers.

21. The method of claim 18 wherein the centralized load tracker is configured to trigger a transfer of a traffic channel from the first server card to the target server card.

22. The method of claim 15 wherein load information is obtained by the first server card directly from other server cards.

23. The method of claim 4, wherein the third radio node and the first radio node belong to different sub-networks.

24. The method of claim 1 further comprising:
using an Internet Protocol network to exchange data packets between the first radio network controllers and the first and second radio nodes.

25. The method of claim 1 wherein the first radio network controller is configured to function as a packet data switching node.

26. The method of claim 1 wherein the first and second radio network controllers are co-located with the first and second radio nodes.

27. The method of claim 1 wherein the external network comprises an Internet Protocol network.

28. A radio access network for wirelessly communicating with mobile access terminals, the radio access network comprising:
a plurality of radio nodes interconnected with a plurality of radio network controllers using a network, wherein each said radio node can address each said radio network controller and each said radio network controller can address each said radio node; and
an interface for exchanging packets between the radio access network and an external network;
wherein each radio network controller is configured to maintain a traffic channel with a mobile access terminal regardless through which radio node the traffic channel passes.

29. The radio access network of claim 28 wherein the network interconnecting the radio nodes and radio network controllers comprises an Internet Protocol network.

30. The radio access network of claim 28 wherein the radio network controllers maintain the traffic channel by routing packets to and from the access terminal via any one of the radio nodes.

31. The radio access network of claim 28 wherein the plurality of radio nodes and the plurality of radio network controllers are associated with a common sub-network.

32. The radio access network of claim 28 wherein each of the radio nodes is associated with a primary radio network controller selected from the plurality of radio network controllers.

33. The radio access network of claim 28 wherein each of the plurality of radio network controllers are enabled to send a paging message to an access terminal via any of the radio nodes.

34. The radio access network of claim 28 wherein each radio network controller comprises:
a plurality of server cards each connected to the network and addressable by each of the plurality of radio nodes, wherein each radio network controller is configured to establish traffic channels with access terminals on each of the plurality of server cards.

35. The radio access network of claim 34 wherein the radio network controller is configured to provide an address of a server card on which a traffic channel is established to one or more radio nodes.

36. The radio access network of claim 28 wherein the plurality of radio nodes comprises:
a first radio node configured to operate on a first frequency channel; and
a second radio node configured to operate on a second frequency channel, wherein the first and second radio nodes are co-located.

37. The radio access network of claim 34 wherein each radio network controller is configured to detect an overload condition in one of its plurality of server cards and select one or more traffic channels handled by an overloaded card for transfer to another card.

38. The radio access network of claim 28 wherein the interface comprises a packet data switching node.

39. The radio access network of claim 28 wherein the interface is part of a radio network controller.

* * * * *